United States Patent
Hiratsuka et al.

(10) Patent No.: US 7,275,054 B2
(45) Date of Patent: Sep. 25, 2007

(54) METHOD OF AND APPARATUS FOR DISTRIBUTING DATA, AND COMPUTER PROGRAM

(75) Inventors: Nobuyuki Hiratsuka, Kawasaki (JP); Makoto Takayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 10/715,409

(22) Filed: Nov. 19, 2003

(65) Prior Publication Data

US 2004/0153447 A1    Aug. 5, 2004

(30) Foreign Application Priority Data

Dec. 26, 2002    (JP)    ............................. 2002-378630

(51) Int. Cl.
G06F 17/30    (2006.01)
G06F 17/00    (2006.01)

(52) U.S. Cl. .......................................... 707/3; 707/102

(58) Field of Classification Search .................... None
See application file for complete search history.

(56) References Cited

U.S. PATENT DOCUMENTS 5,787,244 A * 7/1998 Hiratsuka et al. ............. 714/16
5,813,006 A * 9/1998 Polnerow et al. ............. 707/10
6,658,351 B2 * 12/2003 Seto et al. ................... 701/208

FOREIGN PATENT DOCUMENTS

JP    10-293621    11/1998

* cited by examiner

Primary Examiner—Joon Hwan Hwang
(74) Attorney, Agent, or Firm—Staas & Halsey LLP

(57) ABSTRACT

When a user inputs a first extraction condition and a second extraction condition, a first data group is extracted from data registered in a database based on the first extraction condition, and a second data group is extracted from the database based on the second extraction condition. Then, common data that is data that belongs to both the first data group and the second data group is extracted. Finally, information about the common data and other data, which is data in the second data group other than the common data, is displayed in a distinguishable manner.

12 Claims, 22 Drawing Sheets

FIG.3

PATENT DATABASE (ENTITY DB) 200

| SEQ NUM-BER | DOCUMENT NUMBER | APPLI-CATION NUMBER | FILING DATE | LAID-OPEN/ PUBLIC DISCLO-SURE NUMBER | LAID-OPEN/ PUBLIC DISCLO-SURE DATE | IPC-SUBDIVISION SYMBOL | APPLICANT/ RIGHT HOLDER | INVENTOR/ CREATOR OF DEVICE | TITLE OF THE INVENTION | DATA REGISTRA-TION DATE |
|---|---|---|---|---|---|---|---|---|---|---|
| 1 | JPA NO. H07-068482 | 1993209656 | 19930824 | 1995066193 | 19950310 | H01L 21/316 F | AA CO., LTD. | ×RO ○NISHI | METHOD OF FORMING OXIDE FILM IN SEMICONDUCTOR DEVICE | 19950310 |
| 2 | JPA NO. H07-068487 | 1993207848 | 19930823 | 1995066590 | 19950310 | H05K 13/02 F | AA CO., LTD. | ○○△□ | METHOD OF SUPPLYING ELECTRONIC PARTS | 19950310 |
| 3 | JPA NO. H07-075979 | 1993211891 | 19930826 | 1995067148 | 19950310 | H04Q 1/14 F | BB CO., LTD. | ◇○ ×YAMA | METHOD OF PROCESSING LINK WIR-ING CABLE ON MAIN DISTRIBUTING FRAME OF SWITCHBOARD | 19950310 |
| 4 | JPA NO. H07-076451 | 1993219640 | 19930903 | 1995068482 | 19950314 | B25J 15/04 F | AA CO., LTD. | △ OKAWA | HAND HOLDING APPARATUS | 19950314 |
| 5 | JPA NO. H07-080790 | 1993220783 | 19930906 | 1995068487 | 19950314 | B25J 19/02 F | AA CO., LTD. | △ OKAWA | LOCKING MECHANISM OF FORCE-TORQUE SENSOR AND UNLOCKING METHOD THEREOF | 19950314 |
| 6 | JPA NO. H07-083640 | 1993218943 | 19930902 | 1995072185 | 19950317 | G01R 19/165 F | AA CO., LTD. | ×□TA | POWER SOURCE VOLTAGE MONITORING CIRCUIT | 19950317 |
| 7 | JPA NO. H07-085286 | 1993221616 | 19930907 | 1995072930 | 19950317 | G05D 3/12 F | AA CO., LTD. | ○○◇MOTO | POSITIONING APPARATUS | 19950317 |
| · | ○○○ | ○○○ | ○○○ | ○○○ | ○○○ | ○○○ | ○○○ | ○○○ | ○○○ | ○○○ |
| · | ○○○ | ○○○ | ○○○ | ○○○ | ○○○ | ○○○ | ○○○ | ○○○ | ○○○ | ○○○ |
| · | ○○○ | ○○○ | ○○○ | ○○○ | ○○○ | ○○○ | ○○○ | ○○○ | ○○○ | ○○○ |

FIG.5

| FREE SEARCH | MENU SEARCH | COMMENT SEARCH | CONCEPT SEARCH | LIST OF ABSTRACTS | LIST OF BIBLIOGRAPHY | DISPLAY GAZETTE | SAVE FORMULA | USE FORMULA | STORED INFORMATION | CON-FIGURATION | HELP | TOP | LOG OFF |

416 — 416a

SEARCH OBJECT: ALL GAZETTES (LAID-OPEN/REGISTRATION)
CATEGORY OF PATENT AND UTILITY MODEL: PATENT/UTILITY MODEL
SYNONYM: UNUSED
FREE WORD RANGE: ☑ FULL TEXT ☐ TITLE ☐ ABSTRACT ☐ CLAIM ☐ DETAIL

SEARCH / CLEAR CONDITIONAL FORMULA

INPUT SEARCH CONDITIONS USING A BLANK SPACE AS DELIMITER, AND CLICK THE SEARCH BUTTON.

FREE WORD [ ] AND
APPLICANT (PARTIAL) [ ] OR
IPC (PREFIX) [ ] OR
LAID-OPEN/PUBLIC DISCLOSURE DATE: DOMINICAL YEAR [ ] YEAR [ ] MONTH [ ] DAY ~ [ ] YEAR [ ] MONTH [ ] DAY

SET OPERATION: AND | OR | NOT | NON-DISPLAY SET | CANCEL NON-DISPLAY | SET LIMIT | CANCEL LIMIT | CLEAR HISTORY

SEARCH FORMULA

SEARCH OBJECT: ALL GAZETTES (LAID-OPEN/REGISTRATION), CATEGORY OF PATENT AND UTILITY MODEL: PATENT/UTILITY MODEL, FREE WORD RANGE: FULL TEXT

| No. | NUMBER OF DATA | |
|---|---|---|
| ☐ 001 | 203,626 | IPC (PREFIX)=(B25J or G11B) |
| ☐ 002 | 76,879 | FREE WORD = ROBOT |
| ☐ 003 | 88,226 | APPLICANT (PARTIAL) = A CO., LTD. |
| ☐ 004 | 14,131 | S2 AND S1 |
| ☑ 005 | 433 | S4 AND S3 |

| SEARCH SCREEN | HELP |

[ MAIN FIELD EXTRACTION FORMULA ]

NAME OF SAVING FORMULA

[ SAVE ] — 417a

THE CONTENTS OF THE SEARCH FORMULA TO BE SAVED ARE DISPLAYED/BELOW.

| No. | SEARCH FORMULA |
|---|---|
| | SEARCH OBJECT: ALL GAZETTES (LAID-OPEN/REGISTRATION), CATEGORY OF PATENT AND UTILITY MODEL: PATENT/UTILITY MODEL, FREE WORD RANGE: FULL TEXT |
| 001 | IPC (PREFIX)=(B25J or G11B) |
| 002 | FREE WORD = ROBOT |
| 003 | APPLICANT (PARTIAL) = AA CO., LTD. |
| 004 | S2 AND S1 |
| 005 | S4 AND S3 |

SELECT THE UPPER LIMIT NUMBER OF DATA IN THE MAIN FIELD SET FROM BELOW.
THE MINIMUM CHARGE FOR ONE MONTH IS DETERMINED ACCORDING TO THE SELECTED NUMBER OF DATA.
THE NUMBER OF DATA IN THE MAIN FIELD SET CURRENTLY HIT BY THE CREATED SEARCH FORMULA : 100000.
ACCORDING TO HIT RESULTS, A MENU, THAT MATCHES YOUR REQUIREMENTS, IS DISPLAYED IN RED.

| UPPER LIMIT VALUE | MINIMUM MONTHLY CHARGE | UNIT COST PER ONE DATUM ON PORTION EXCEEDING THE UPPER LIMIT | UNIT COST PER ONE DATUM OTHER THAN THE MAIN FIELD SET |
|---|---|---|---|
| UP TO 10000 | 50000 YEN (5 YEN/DATA) | 25 YEN/DATA | UNIFORMLY 200 YEN/DATA |
| UP TO 50000 | 200000 YEN (4 YEN/DATA) | 20 YEN/DATA | |
| UP TO 100000 | 250000 YEN (2.5 YEN/DATA) | 13 YEN/DATA | |
| UP TO 500000 | 500000 YEN (1 YEN/DATA) | 5 YEN/DATA | |
| UP TO 1000000 | 800000 YEN (0.8 YEN/DATA) | 4 YEN/DATA | |
| UP TO 2000000 | 1400000 YEN (0.7 YEN/DATA) | 4 YEN/DATA | |
| UP TO 3000000 | 1800000 YEN (0.6 YEN/DATA) | 3 YEN/DATA | |
| UP TO 4000000 | 2000000 YEN (0.5 YEN/DATA) | 3 YEN/DATA | |
| UP TO 5000000 | 2250000 YEN (0.45 YEN/DATA) | 3 YEN/DATA | |

419

SET THE TYPE OF GAZETTES TO BE PREFERENTIALLY WITHIN THE UPPER LIMIT VALUE.

○ OLDER ISSUE DATE OF A GAZETTE IS PRIORITIZED.
○ LATER ISSUE DATE OF A GAZETTE ARE PRIORITIZED.
○ PATENT GAZETTE IS PRIORITIZED.
● SPECIFIED APPLICANT SET ON THE RIGHT SECTION IS PRIORITIZED.   AA CO., LTD.  XX CO., LTD.  YY CO., LTD.
○ SPECIFIED APPLICANT SET ON THE RIGHT SECTION IS PRIORITIZED.
○ IPC CLASSIFICATION SET ON THE RIGHT SECTION IS PRIORITIZED.

420

[ SET ]  [ CANCEL ]

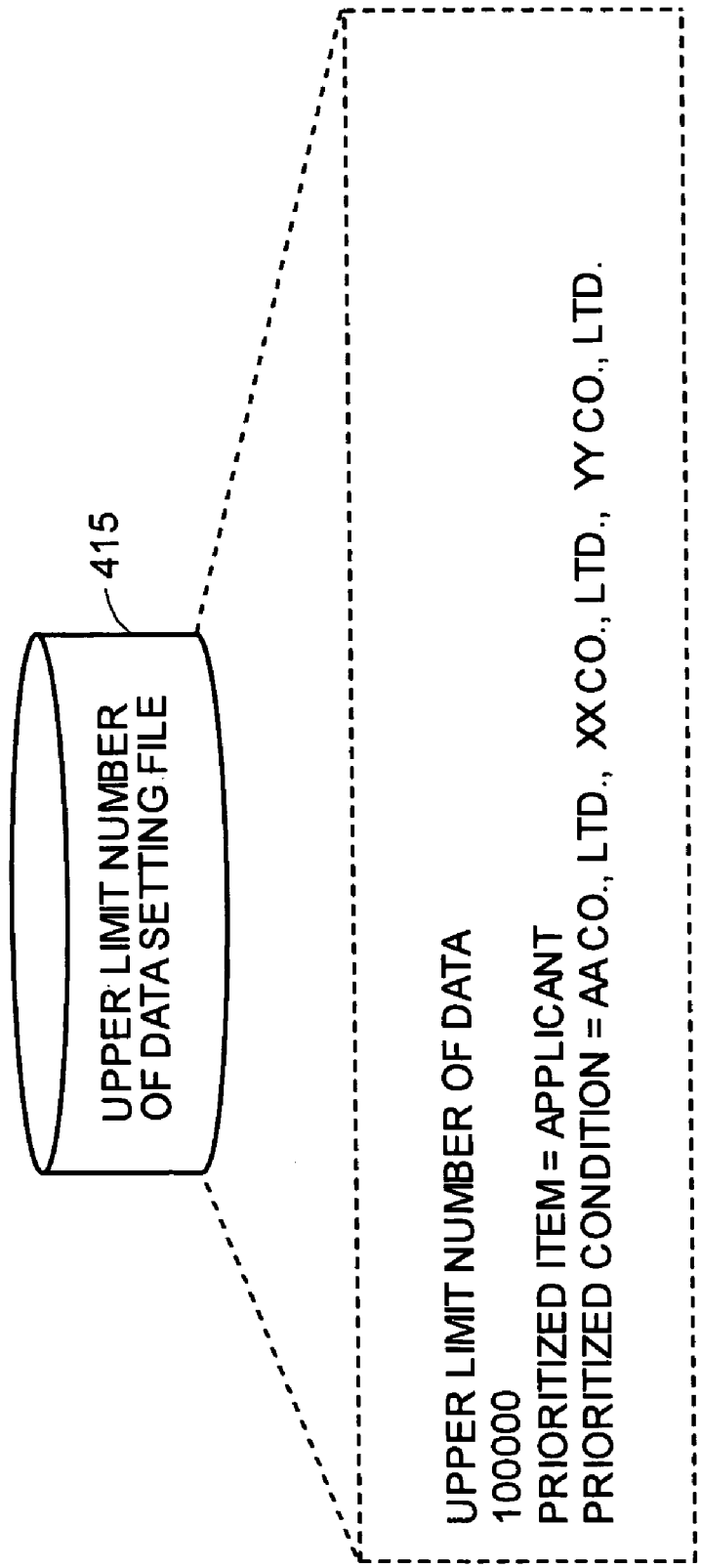

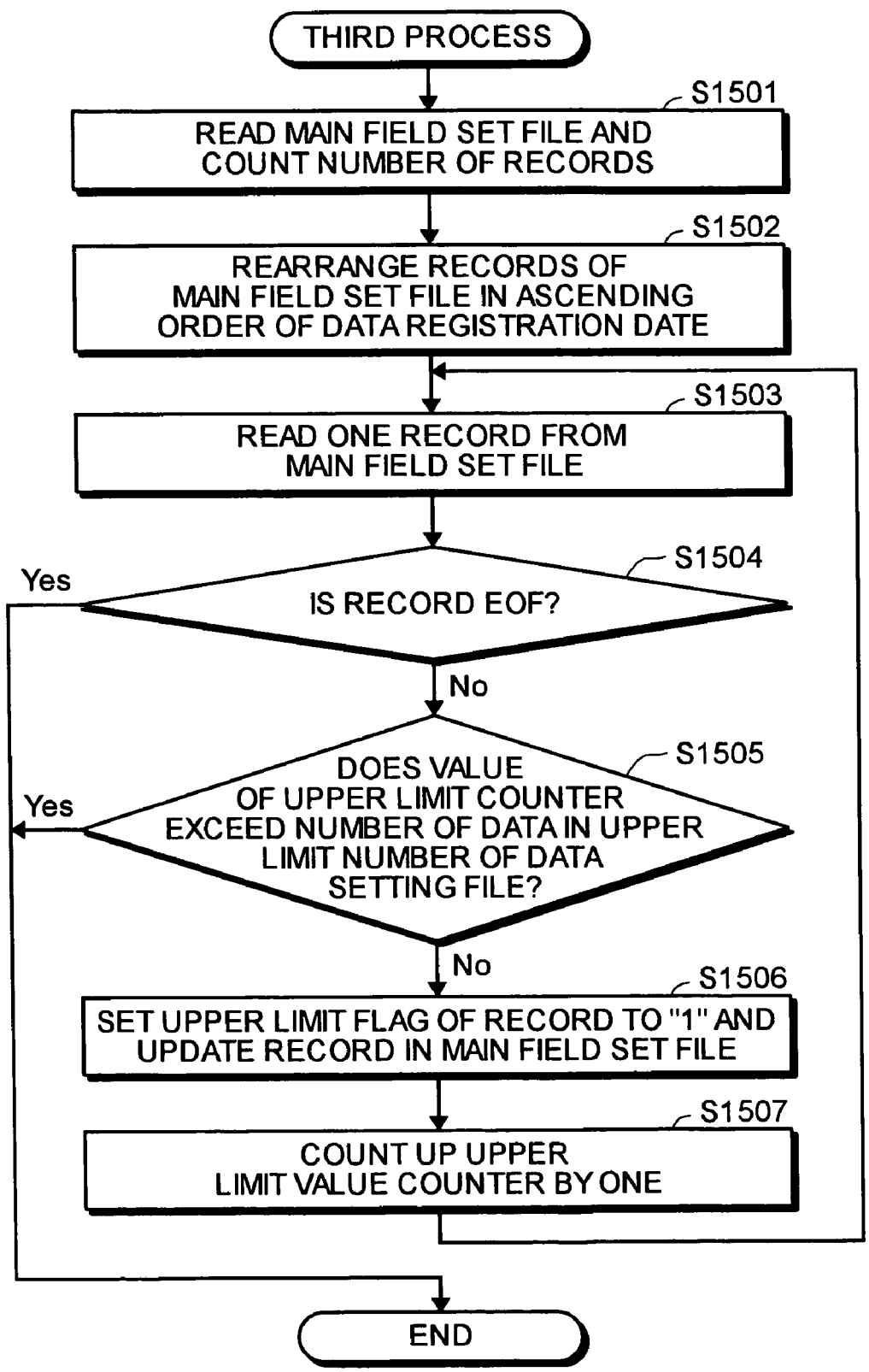

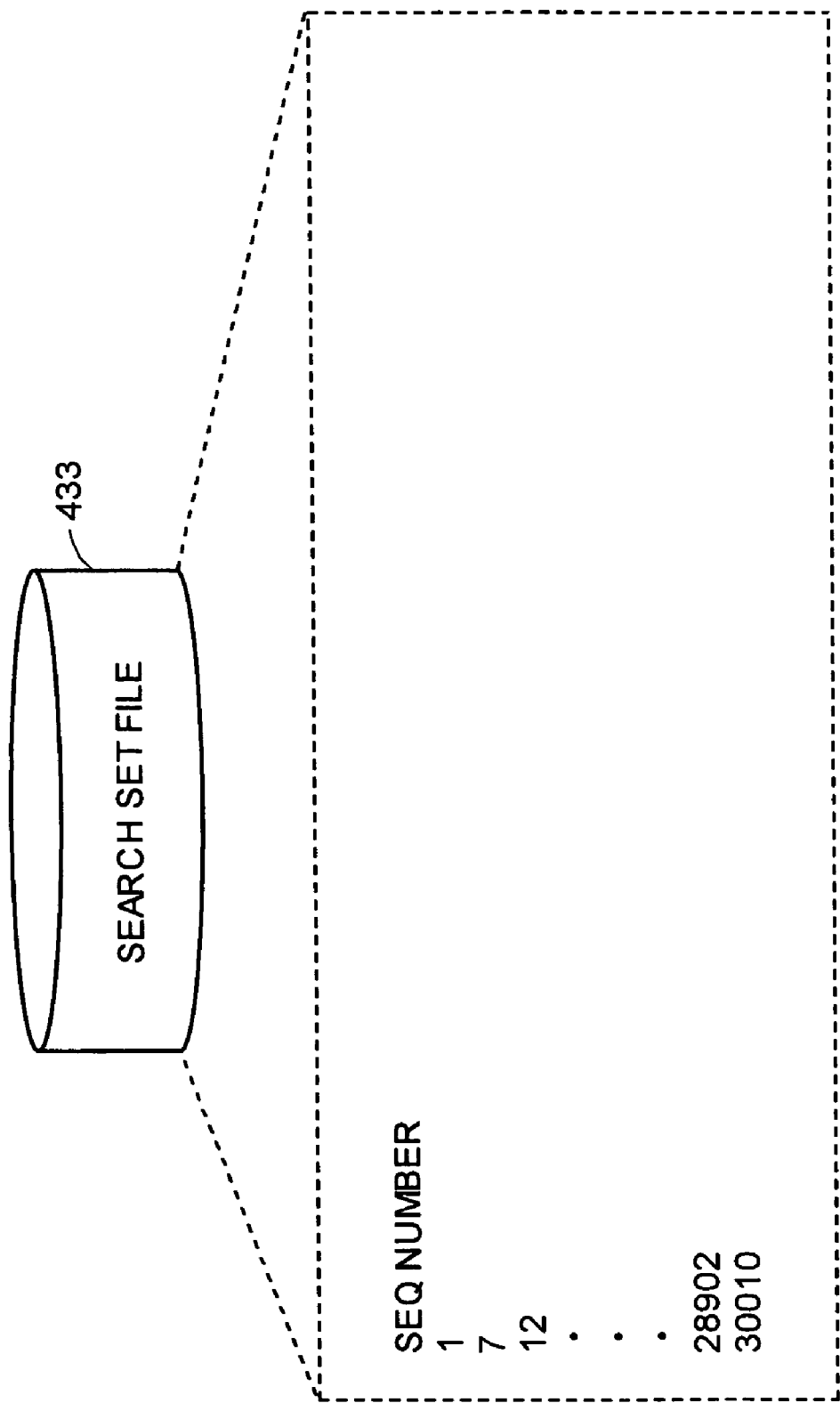

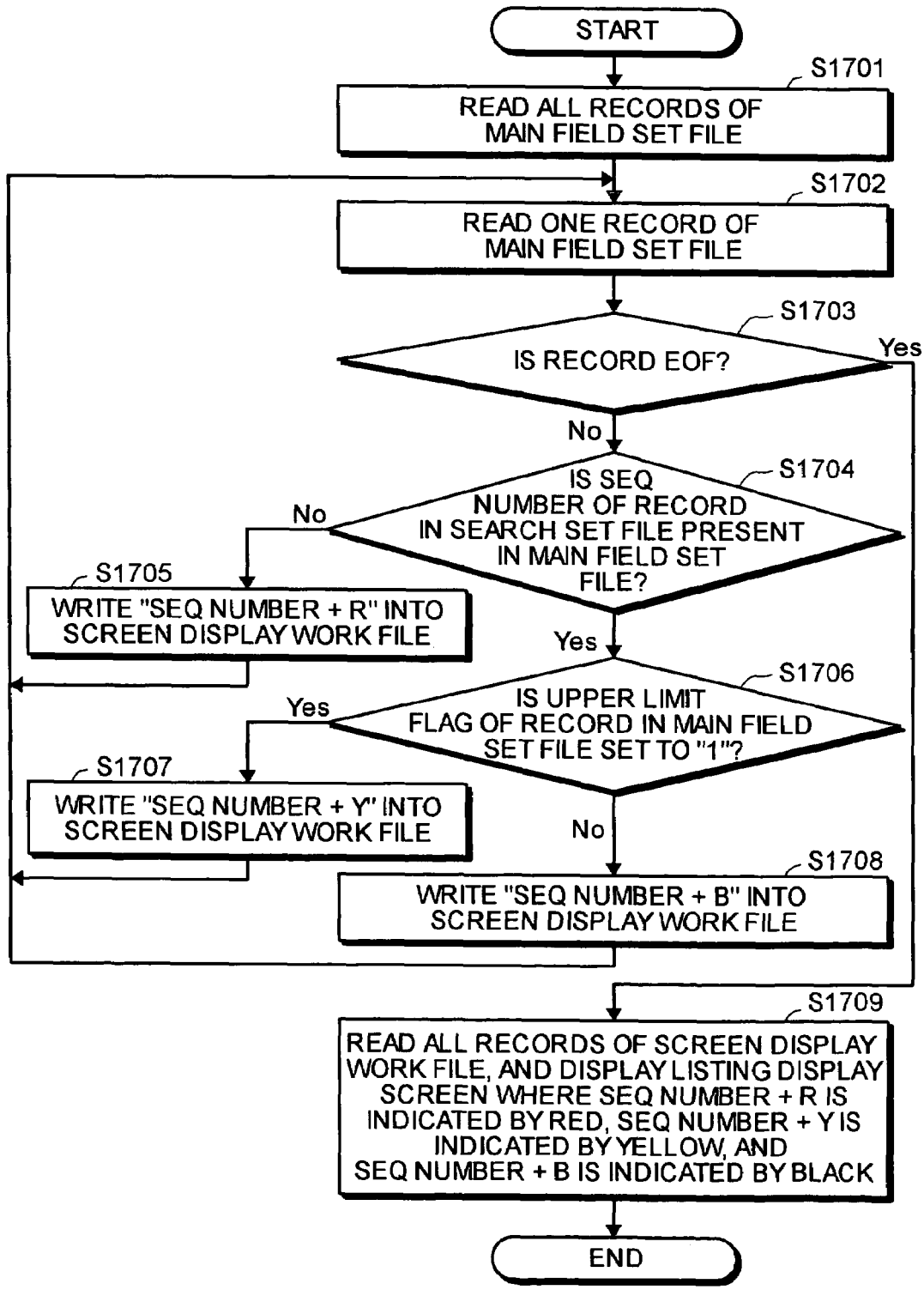

| No. | DOCUMENT NUMBER | CLASSIFI-CATION | TITLE OF THE INVENTION | APPLICANT | IPC-SUBDIVI-SION SYMBOL | APPLICATION NUMBER |
|---|---|---|---|---|---|---|
| 000001 | JPA NO. Hxx-0001 | LAID-OPEN | HAND HOLDING APPARATUS | AA CO., LTD. | B25J 15/04 | JPA NO. Hxx-0001 |
| 000002 | JPA NO. Hxx-0002 | LAID-OPEN | LOCKING MECHANISM OF FORCE-TORQUE SENSOR AND UNLOCKING METHOD THEREOF | AA CO., LTD. | B25J 19/02 | JPA NO. Hxx-0002 |
| 000003 | JPA NO. Hxx-0003 | LAID-OPEN | MASTER UNIT | AA CO., LTD. | B25J 3/00 | JPA NO. Hxx-0003 |
| 000004 | JPA NO. Hxx-0004 | LAID-OPEN | MAGNETIC DISC APPARATUS AND MANUFACTURING METHOD THEREOF | AA CO., LTD. | G11B 25/04 101 | JPA NO. Hxx-0004 |
| 000005 | JPA NO. Hxx-0005 | LAID-OPEN | THREE-DIMENSIONAL OBJECT HOLDING SYSTEM | AA CO., LTD. | B25J 13/08 | JPA NO. Hxx-0005 |
| 000006 | JPA NO. Hxx-0006 | LAID-OPEN | TILT ANGLE DETECTING DEVICE AND ROBOT HAVING TILT ANGLE DETECTING DEVICE | AA CO., LTD. | G01B 11/26 | JPA NO. Hxx-0006 |
| 000007 | JPA NO. Hxx-0007 | LAID-OPEN | IMAGE PROCESSING DEVICE | AA CO., LTD. | G06T 7/60 | JPA NO. Hxx-0007 |
| 000008 | JPA NO. Hxx-0008 | LAID-OPEN | LIBRARY DEVICE | AA CO., LTD. | G11B 17/22 | JPA NO. Hxx-0008 |
| 000009 | JPA NO. Hxx-0009 | LAID-OPEN | HORIZONTAL ARTICULATED ROBOT, ARM UNIT, AND WORKING SYSTEM | CC CO., LTD. | B25J 9/06 | JPA NO. Hxx-0009 |
| 000010 | JPA NO. Hxx-0010 | LAID-OPEN | LIBRARY DEVICE | AA CO., LTD. | G11B 17/26 | JPA NO. Hxx-0010 |
| 000011 | JPA NO. Hxx-0011 | LAID-OPEN | OBSTACLES AVOIDING PATH GENERATING SYSTEM | AA CO., LTD. | G05D 1/02 | JPA NO. Hxx-0011 |
| 000012 | JPA NO. Hxx-0012 | LAID-OPEN | AUDIO EQUIPMENT AND PERFORMANCE AUTOMATICALLY MEASURING SYSTEM THEREOF | CC CO., LTD. | G11B 19/02 501 | JPA NO. Hxx-0012 |
| 000013 | JPA NO. Hxx-0013 | LAID-OPEN | MANIPULATOR CONTROL DEVICE | AA CO., LTD. | B25J 9/10 | JPA NO. Hxx-0013 |
| 000014 | JPA NO. Hxx-0014 | LAID-OPEN | METHOD OF AVOIDING SINGULAR POINT OF MASTER-SLAVE MANIPULATOR | AA CO., LTD. | B25J 3/00 | JPA NO. Hxx-0014 |
| 000015 | JPA NO. Hxx-0015 | LAID-OPEN | DESK TYPE ROBOT | CC CO., LTD. | B25J 9/02 | JPA NO. Hxx-0015 |
| 000016 | JPA NO. Hxx-0016 | LAID-OPEN | INTERFACE DEVICE | AA CO., LTD. | B25J 13/04 | JPA NO. Hxx-0016 |
| 000017 | JPA NO. Hxx-0017 | LAID-OPEN | FLOOR STANDING ROBOT | CC CO., LTD. | B25J 9/02 | JPA NO. Hxx-0017 |
| 000018 | JPA NO. Hxx-0018 | LAID-OPEN | FLOOR STANDING ROBOT | CC CO., LTD. | B65G 21/14 | JPA NO. Hxx-0018 |

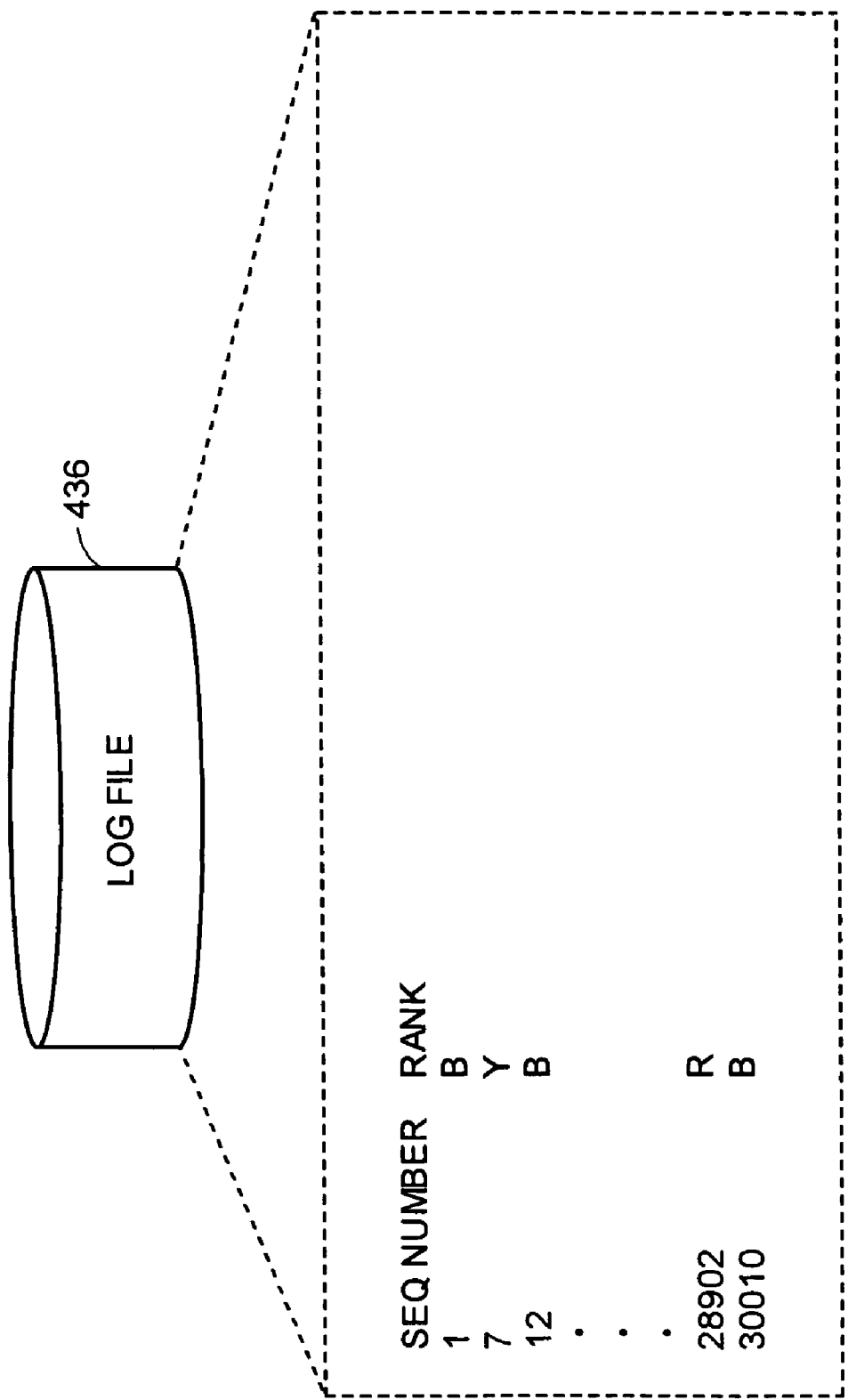

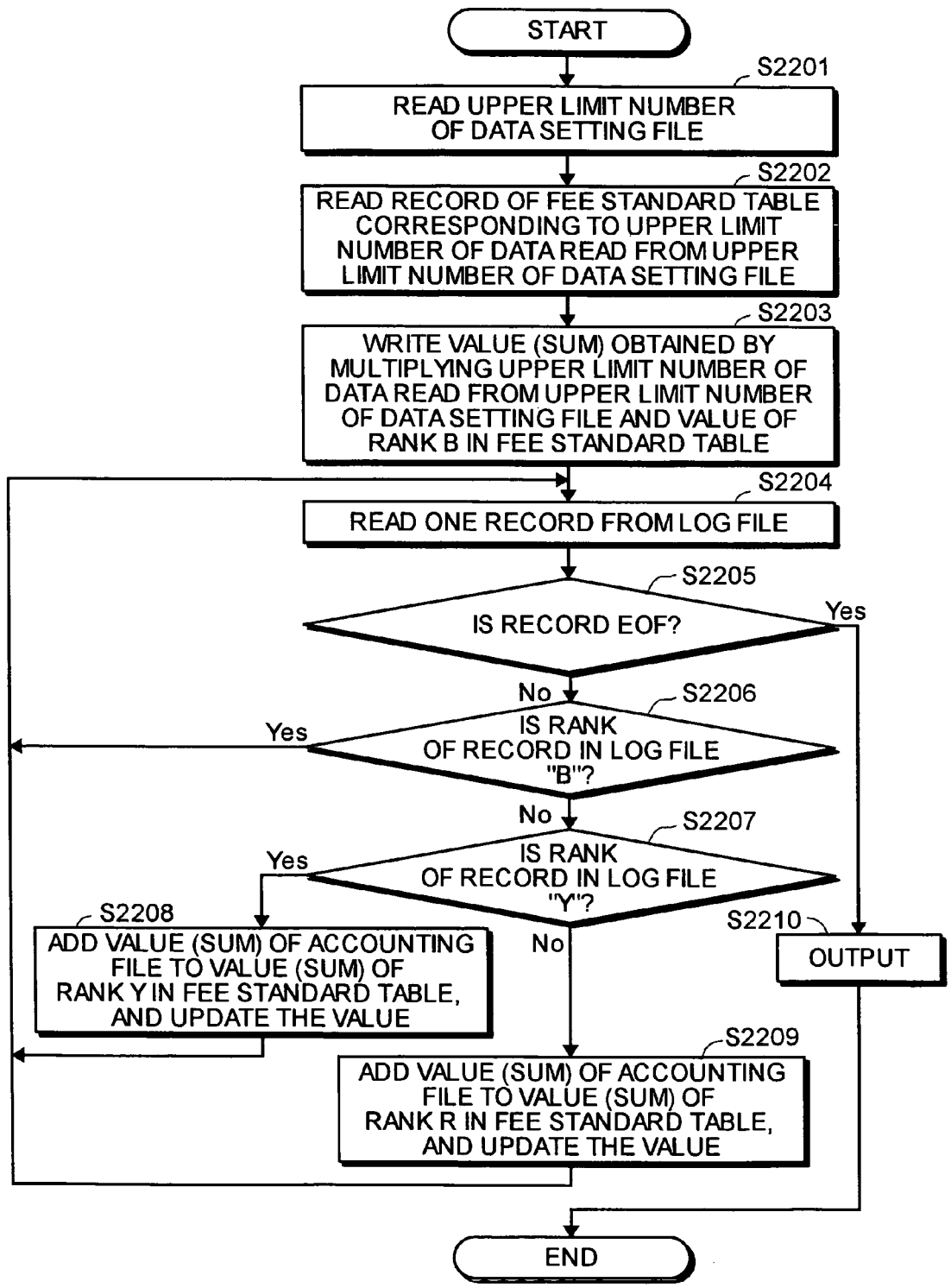

METHOD OF AND APPARATUS FOR DISTRIBUTING DATA, AND COMPUTER PROGRAM

CROSS-REFERENCE TO RELATED APPLICATIONS

This application is based upon and claims the benefit of priority from the prior Japanese Patent Application No.2002-378630, filed on Dec. 26, 2002, the entire contents of which are incorporated herein by reference.

BACKGROUND OF THE INVENTION

1) Field of the Invention

The present invention relates to a data distribution method, a computer program, and a data distribution apparatus that distribute data for a fee, via a network such as the Internet.

2) Description of the Related Art

Conventionally, since it is premised that data distribution services are provided to an unspecified number of clients via a network such as the Internet, the data distributed by such services include information that is obviously not necessary, i.e., noise, to the clients. For example, the patent information database available over the Internet includes information about patents in various fields, such as livingware, electrical appliances, or chemistry, and is stored in the database.

In the fee-based data distribution services provided over the Internet, the receiver of the service is charged at a metered rate. Such a technique is disclosed in Japanese Patent Application Laid-open No. H10-293621.

Thus, conventionally, although the clients are interested in information related to a specified field (hereinafter, "main field") they have to receive information related to various other fields (hereinafter, "noise field") as well. For example, although a chemical manufacturer is interested in information related to the chemical field of the patent classification (IPC), the patent database includes information related to various other fields. Thus, the client is mainly interested in only a part of the information in the database and may need the other information only occasionally.

SUMMARY OF THE INVENTION

It is an object of the present invention to solve at least the problems in the conventional technology.

A data distribution method according to one aspect of the present invention includes inputting a first extraction condition; extracting a first data group from data registered in a database based on the first extraction condition; inputting a second extraction condition; extracting a second data group from the database based on the second extraction condition; extracting common data that is data that belongs to both the first data group and the second data group; and displaying information about the common data and other data, which is data in the second data group other than the common data, in a distinguishable manner.

A data distribution method according to another aspect of the present invention includes inputting a first extraction condition; extracting a first data group from data registered in a database based on the first extraction condition; inputting an order condition; arranging the data in the first data group in a specific order based on the order condition; inputting a second extraction condition; extracting a second data group from the database based on the second extraction condition; extracting common data that is data that belongs to both the first data group arranged in the specific order and the second data group; inputting an upper limit number; extracting from the common data first the upper limit number of data as a third data group; and displaying information about the third data group and other data, which is data in the second data group other than the third data group, in a distinguishable manner.

A data distribution method according to still another aspect of the present invention includes inputting a first extraction condition; extracting a first data group from data registered in a database based on the first extraction condition; inputting an order condition; arranging the data in the first data group in a specific order based on the order condition; inputting a second extraction condition; extracting a second data group from the database based on the second extraction condition; extracting common data that is data that belongs to both the first data group arranged in the specific order and the second data group; inputting an upper limit number; extracting from the common data first the upper limit number of data as a third data group; extracting from the common data, data other than the third data group as a fourth data group; displaying information about the third data group, the fourth data group, and other data, which is data in the second data group other than the third data group and the fourth data group, in a distinguishable manner.

A data distribution method according to still another aspect of the present invention includes inputting a first extraction condition; extracting a first data group from data registered in a database based on the first extraction condition; inputting a second extraction condition; extracting a second data group from the database based on the second extraction condition; extracting common data that is data that belongs to both the first data group and the second data group; displaying information about the common data and other data, which is data in the second data group other than the common data, in a distinguishable manner; and deciding a fee to be charged for distribution of data based on contents of the common data.

A data distribution apparatus according to still another aspect of the present invention includes an inputting unit that receives input of a first extraction condition and a second extraction condition; an extracting unit that extracts a first data group from data registered in a database based on the first extraction condition, extracts a second data group from the database based on the second extraction condition, and extracts common data that is data that belongs to both the first data group and the second data group; and a display controller that displays information about the common data and other data, which is data in the second data group other than the common data, in a distinguishable manner.

A data distribution apparatus according to still another aspect of the present invention includes an inputting unit that receives input of a first extraction condition, a second extraction condition, an order condition, and an upper limit number; a first extracting unit that extracts a first data group from data registered in a database based on the first extraction condition; an arranging unit that arranges the data in the first data group in a specific order based on the order condition; a second extracting unit that extracts a second data group from the database based on the second extraction condition, extracts common data that is data that belongs to both the first data group arranged in the specific order and the second data group, and extracts from the common data first the upper limit number of data as a third data group; and a display controller that displays information about the third data group and other data, which is data in the second data group other than the third data group, in a distinguishable manner.

A data distribution apparatus according to still another aspect of the present invention includes an inputting unit that receives input of a first extraction condition, a second extraction condition, an order condition, and an upper limit number; a first extracting unit that extracts a first data group from data registered in a database based on the first extraction condition; an arranging unit that arranges the data in the first data group in a specific order based on the order condition; a second extracting unit that extracts a second data group from the database based on the second extraction condition, extracts common data that is data that belongs to both the first data group arranged in the specific order and the second data group, extracts from the common data first the upper limit number of data as a third data group, and extracts from the common data, data other than the third data group as a fourth data group; and a display controller that displays information about the third data group, the fourth data group, and other data, which is data in the second data group other than the third data group and the fourth data group, in a distinguishable manner.

A data distribution apparatus according to still another aspect of the present invention includes an inputting unit that receives input of a first extraction condition and a second extraction condition; an extracting unit that extracts a first data group from data registered in a database based on the first extraction condition, extracts a second data group from the database based on the second extraction condition, and extracts common data that is data that belongs to both the first data group and the second data group; a display controller that displays information about the common data and other data, which is data in the second data group other than the common data, in a distinguishable manner; and a fee deciding unit that decides a fee to be charged for distribution of data based on contents of the common data.

The computer program(s) according to still another aspect of the present invention realizes the above-mentioned method(s) according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 illustrates a table structure of an entity database (hereinafter, "DB");

FIG. 5 illustrates a search formula creating screen with which a service administrator creates an extraction formula;

FIG. 6 illustrates a search formula saving screen with which the search formula is saved;

FIG. 8 is for explaining an upper limit number of data setting screen with which the service administrator sets the upper limit number of data;

FIG. 9 is an example of contents of an upper limit number of data setting file;

FIG. 15 is a flowchart of a third process executed as part of the process before starting service executed by the main field set creating AP;

FIG. 16 illustrates one example of the contents of a search set file;

FIG. 17 is a flowchart of color code (ranking) determination process executed by a list display AP;

FIG. 18 is an example of a list display screen;

FIG. 19 is an example of contents of a log file;

FIG. 22 is a flowchart of a fee calculating process executed by a fee calculating AP.

DETAILED DESCRIPTION

Exemplary embodiments of a data distribution method, a computer program, and a data distribution apparatus according to the present invention are detailed below with reference to the accompanying drawings.

Figure 1:
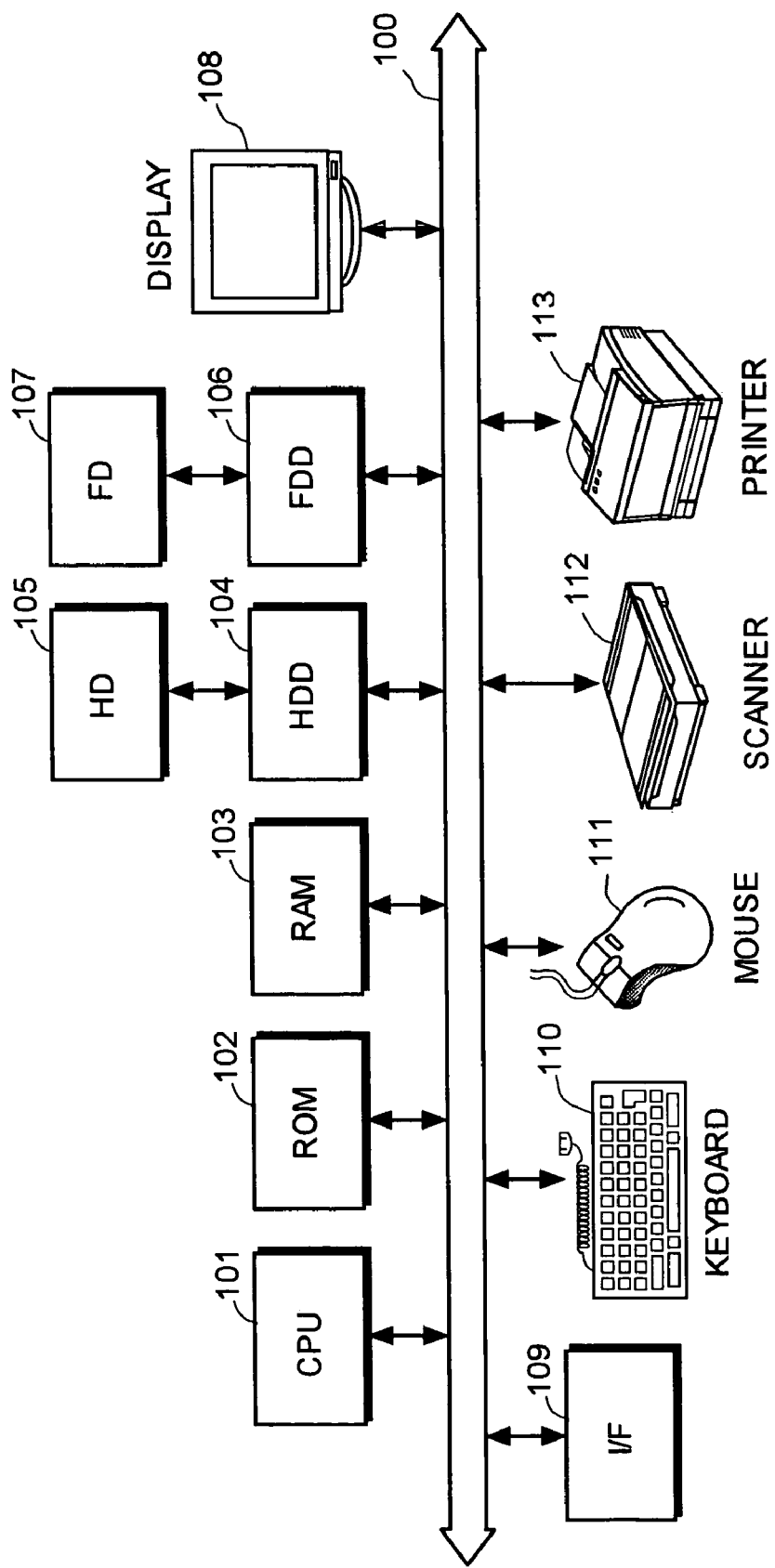
FIG. 1 is a block diagram of a hardware configuration of a data distribution apparatus according to an embodiment of the present invention.

FIG. 1 is a block diagram of the hardware configurations of the data distribution apparatus and the information terminal device according to the embodiment of the present invention.

This data distribution apparatus (server) includes a central processing unit (hereinafter, "CPU") 101, a read only memory (hereinafter, "ROM") 102, a random access memory (hereinafter, "RAM") 103, a hard disk drive (hereinafter, "HDD") 104, a hard disk (hereinafter, "HD") 105, a flexible disk drive (hereinafter, "FDD") 106, a flexible disk (hereinafter, "FD") 107 as one example of a detachable recording medium, a display 108, an interface (hereinafter, "I/F") 109, a keyboard 110, a mouse 111, a scanner 112, and a printer 113. The respective components are connected by a bus 100.

The CPU 101 controls the entire data distribution apparatus. The ROM 102 contains program such as a boot program. The RAM 103 is used as a work area of the CPU 101. The HDD 104 controls reading/writing of data from/into the HD according to the control of the CPU 101. The HD 105 contains the data written by the control of the HDD 104.

The FDD 106 controls reading/writing of data from/into the FD 107 according to the control of the CPU 101. The data written by the control of the FDD 106 are stored in the FD 107, and the data recorded in the FD 107 are read by an information processing device. Besides the FD 107, a CD-ROM (CD-R or CD-RW), a magnet optical (hereinafter, "MO"), a digital versatile disk (hereinafter, "DVD"), a memory card, and the like may be used as the detachable recording medium. The display 108 displays a window (browser) relating to data such as a cursor, icons, a tool box, a document, an image, and function information. Examples of the display 108 are a cathode ray tube (CRT), a thin film transistor (TFT) liquid crystal display, and a plasma display.

The I/F 109 is connected with a network 250 (see FIG. 2) via a communication line, and is connected with other servers and information processing devices via the network 250. The I/F 109 controls interface between the network 250 and the internal components so as to control input/output of data from other servers and information terminal devices. The I/F 109 is a modem, a local area network (LAN) adaptor, or the like.

The keyboard 110 has keys for inputting characters, numerals, various instructions, and the like, and data are input by it. The keyboard 110 may be a touch panel type input pad, a ten key, or the like. The mouse 111 moves a cursor, selects a moving range of the cursor, moves a window, changes a size of a window, and the like. The mouse 111 may be a trackball, a joystick, a cross key, a jog dial, or the like as long as it functions as pointing device.

The scanner 112 reads an image optically and captures image data into the information processing device. The printer 113 prints image data and document data. Examples of the printer 113 are a laser printer and an inkjet printer.

Figure 2:
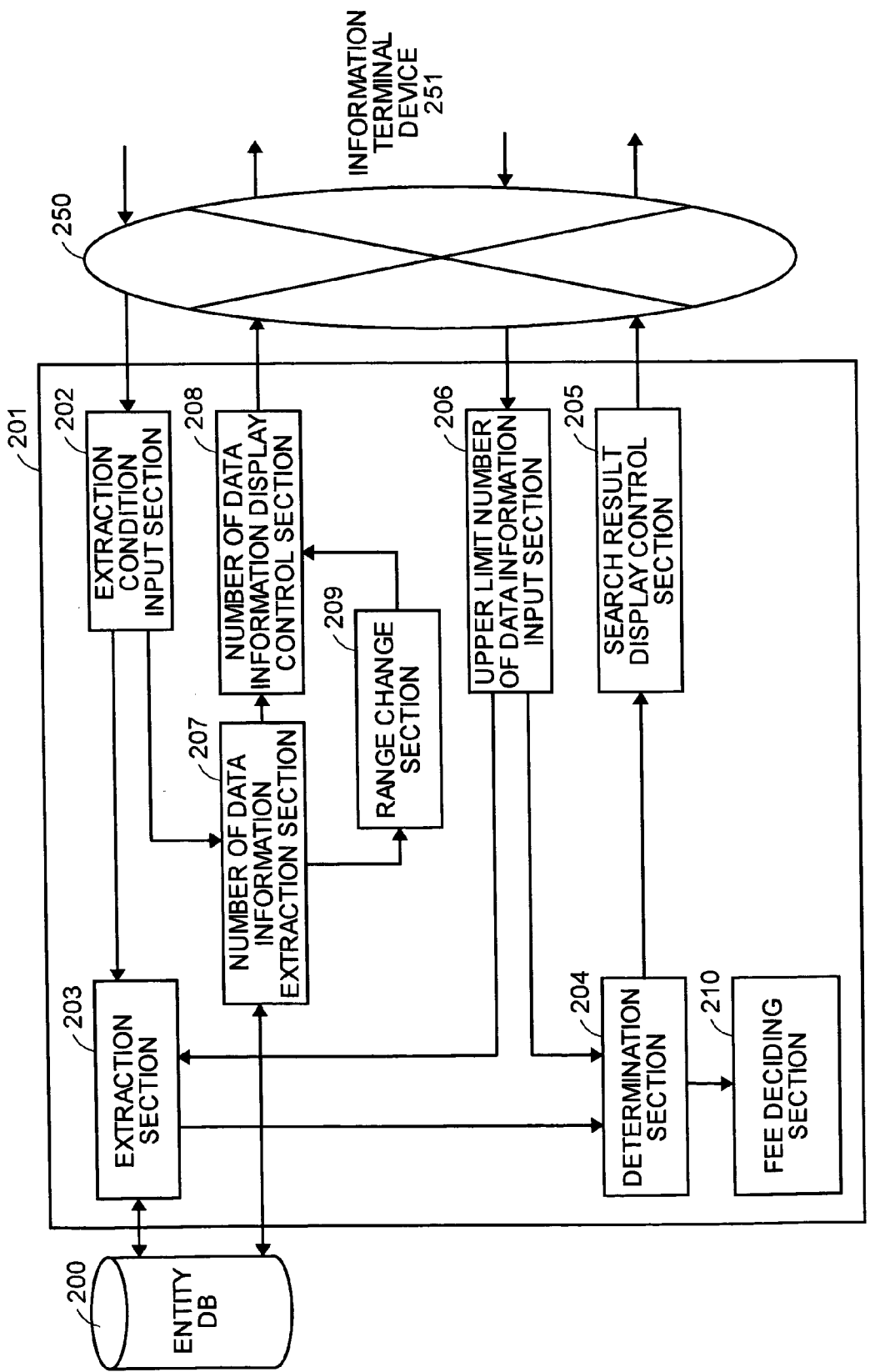
FIG. 2 is a block diagram of a functional configuration of the data distribution apparatus according to the embodiment.

FIG. 2 is a block diagram of the functional configuration of the data distribution apparatus. This data distribution apparatus 201 is connected with an entity DB (database) 200, and includes an extraction condition input section 202, an extraction section 203, a determination section 204, a search result display control section 205, an upper limit number of data information input section 206, a number of data information extraction section 207, a number of data information display control section 208, a range change section 209, and a fee deciding section 210.

FIG. 3 illustrates a table structure of the entity DB. FIG. 3 illustrates an example of a patent database as the entity DB 200. The patent database contains information of all fields, namely, information about a plurality of items of patent gazettes in all the fields including IPCs A to H. The database can be searched by various search keys such as free word, applicant name, patent classification, and the like.

The extraction condition input section 202 accepts input of an extraction condition used for extracting a desired data group (hereinafter, "first data group"). The extraction condition is input based on an extraction formula that is input using the information terminal device 251 via the network 250. Specific contents of the extraction formula are explained later. Specifically, the function of the extraction condition input section 202 is realized by the I/F 109 illustrated in FIG. 1, for example.

The extraction section 203 extracts from the entity DB 200, in which data are recorded, information about the first data group corresponding to the extraction condition. Specifically, the function of the extraction section 203 is realized by the CPU 101 upon executing programs stored in the ROM 102, the RAM 103, the HD 105, the FD 107, or by the I/F 109.

Based on a search condition, data are searched from the data registered in the entity DB 200 database. The determination section 204 determines a common data that is the data that belong to both the data searched and to the first data group. Specifically, the function of the determination section 204 is realized by the CPU 101 upon executing the programs stored in the ROM 102, the RAM 103, the HD 105, the FD 107, and the like.

When displaying a list of information about headers of the searched data on the information terminal device 251, the search result display control section 205 displays two pieces of information on the information terminal device 251 in a distinguishable manner based on the result determined by the determination section 204. The two pieces of information include the information about headers of the data in the first data group and information about headers of data not belonging to the first data group. Specifically, the function of the search result display control section 205 is realized by the CPU 101 upon executing the programs stored in the ROM 102, the RAM 103, the HD 105, the FD 107, and the like, for example, or by the I/F 109.

When the data in the first data group are arranged in a predetermined order, the upper limit number of data information input section 206 accepts input of information about the upper limit number of data according to the predetermined order. Specifically, the function of the upper limit number of data information input section 206 is realized by the I/F 109, for example.

At this time, the extraction section 203 accesses the entity DB 200, and extracts information about a second data group included in the upper limit number of data at the time of arrangement in the predetermined order, from the data recorded in the entity DB 200. When the data recorded in the entity DB 200 are searched, the determination section 204 determines whether the searched data belong to the second data group based on the information extracted by the extraction section 203. When displaying a list, the search result display control section 205 displays two pieces of information on the information terminal device 251 in a distinguishable manner based on the result determined by the determination section 204. The two pieces of information include information relating to headers of the data belonging to the second data group and information about headers of data not belonging to the second data group.

The extraction section 203 accesses the entity DB 200, and extracts the information about the first data group corresponding to the extraction condition and the information about the second data group included in the upper limit number of data at the time of arrangement in the predetermined order from the data recorded in the entity DB 200.

When the data recorded in the entity DB 200 are searched, the determination section 204 determines whether the searched data belong to the first data group based on the information extracted by the extraction section 203. The determination section 204 further determines whether the searched data belong to the second data group. When displaying a list, the search result display control section 205 displays three pieces of information on the information terminal device 251 in a discriminable manner based on the result determined by the determination section 204. The three pieces of information include the information about headers of the data belonging only to the first data group, the information about the headers of the data belonging only to the second data group, and information about headers of the data not belonging to the first data group.

The number of data information extraction section 207 accesses the entity DB 200, and extracts information about the number of data belonging to the first data group corresponding to the extraction condition from the data recorded in the entity DB 200. Specifically, the function of the number of data information extraction section 207 is realized by the CPU 101 upon executing the programs stored in the ROM 102, the RAM 103, the HD 105, the FD 107, and the like, for example, and by the I/F 109 illustrated in FIG. 1.

The number of data information display control section 208 displays on the information terminal device 251, the information about the number of data extracted by the number of data information extraction section 207. Specifically, the function of the number of data information display control section 208 is realized by the CPU 101 upon executing the programs stored in the ROM 102, the RAM 103, the HD 105, the FD 107, and the like, and by the I/F 109 illustrated in FIG. 1. After the number of data information display control section 208 displays the information about the number of data on the information terminal device 251, the upper limit number of data information input unit 206 accepts input of the information about the upper limit number of data from the information terminal device 251.

In the upper limit number of data information input section 206, the range change section 209 changes a range of the upper limit number of data capable of being input on the information terminal device 251 based on the information about the number of data extracted by the number of data information extraction section 207. Specifically, the function of the range change section 209 is realized by the CPU 101 upon executing the programs stored in the ROM 102, the RAM 103, the HD 105, the FD 107, and the like illustrated in FIG. 1.

The fee deciding section 210 determines a fee to be charged when distributing the information about the contents of the searched data based on the result determined by the determination section 204. Specifically, the function of the fee deciding section 210 is realized by the CPU 101 upon executing the programs stored in the ROM 102, the RAM 103, the HD 105, the FD 107, and the like illustrated in FIG. 1.

Figure 4:
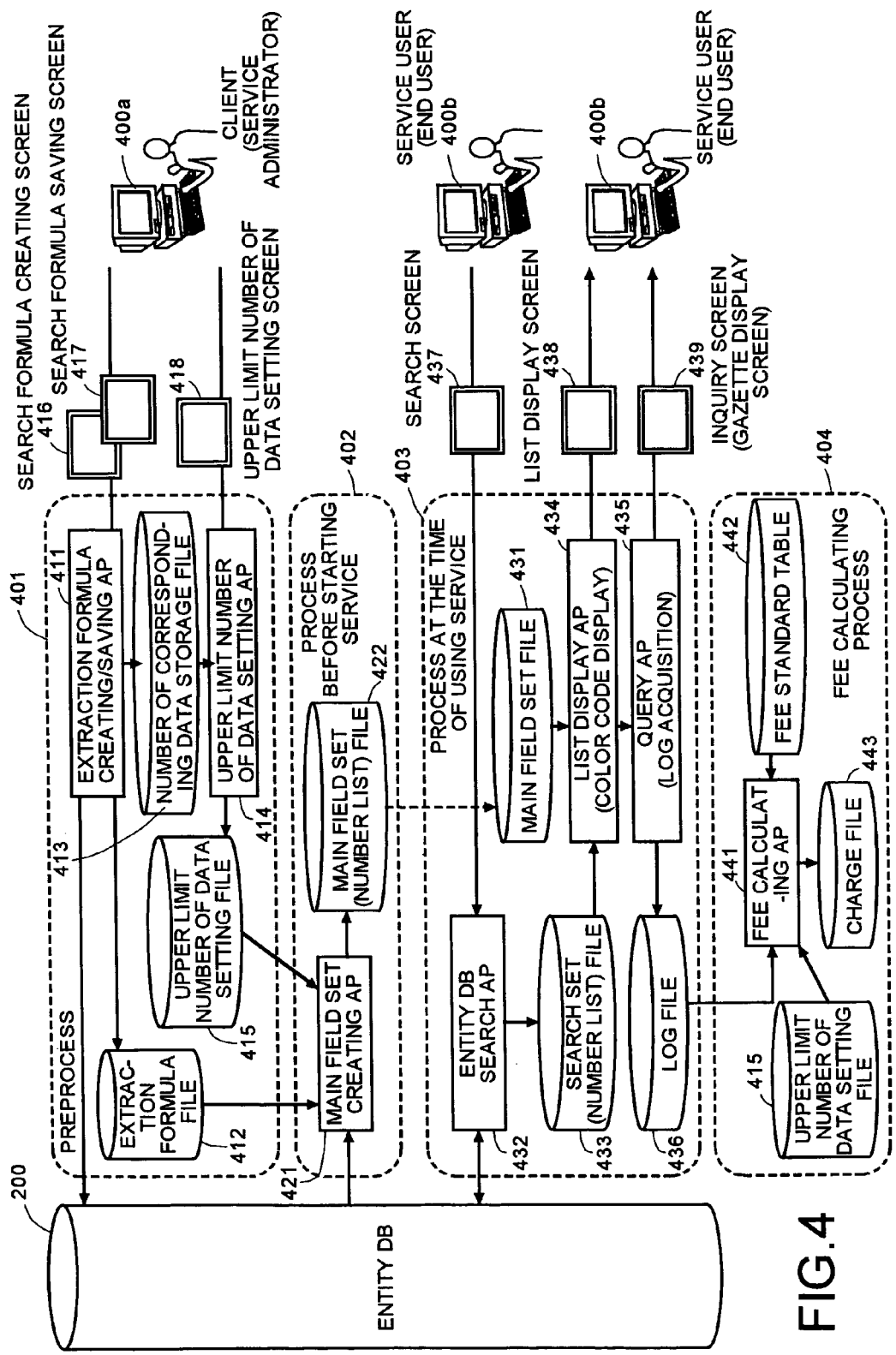
FIG. 4 illustrates an outline of a data distribution method according to the embodiment.

FIG. 4 illustrates an outline of the data distribution method according to the present embodiment. This data distribution method includes a preprocess 401, a process before starting service 402, a process at the time of using service 403, and a fee calculating process 404. The preprocess 401 is pre-executed by a client (service administrator) 400a before using the search service, i.e., at the time of a contract. The process before starting service 402 is executed before the service is started for the service user (end user) 400b, i.e. every morning. The process at the time of using service 403 is executed when the service is used by the service user 400b, i.e., from starting to stopping of the service, for example. The fee calculating process 404, such as a monthly process, is executed after end of the service.

The preprocess 401 requires an extraction formula creating/saving AP 411, an extraction formula file 412, a number of corresponding data storage file 413, an upper limit number of data setting AP 414, and an upper limit number of data setting file 415.

The client (service administrator) 400a prepares a search condition formula (that is, "extraction formula") which defines a main field to be mainly used for the search. When, for example, the client 400a is a firm of automobile parts, machinery in patent classification (section B in the IPC section) is set as the search formula. The service administrator 400a inputs the search condition formula within a range to be searched on a search formula creating screen 416. FIG. 5 illustrates a search formula creating screen with which the service administrator 400a creates the extraction formula.

In FIG. 5, '001' to '005' are the extraction formulas. In '001', the extraction condition is such that IPC is "B25J" or "G11B" in prefix search. Similarly, the extraction condition in '002' is that a free word contains "robot", and in '003', the applicant contains "A Co., Ltd.". Further, the extraction condition in '004' is "S2 AND S1", and this represents AND condition of S2 (='002') and S1 (='001').

FIG. 6 illustrates a search formula saving screen 417 with which the search formula is saved. When a "save formula" button 416a of FIG. 5 is clicked, the search formula saving screen 417 (FIG. 6) is displayed. In FIG. 6, when saving the displayed search formula, the service administrator 400a clicks a "save" button 417a.

Figure 7:
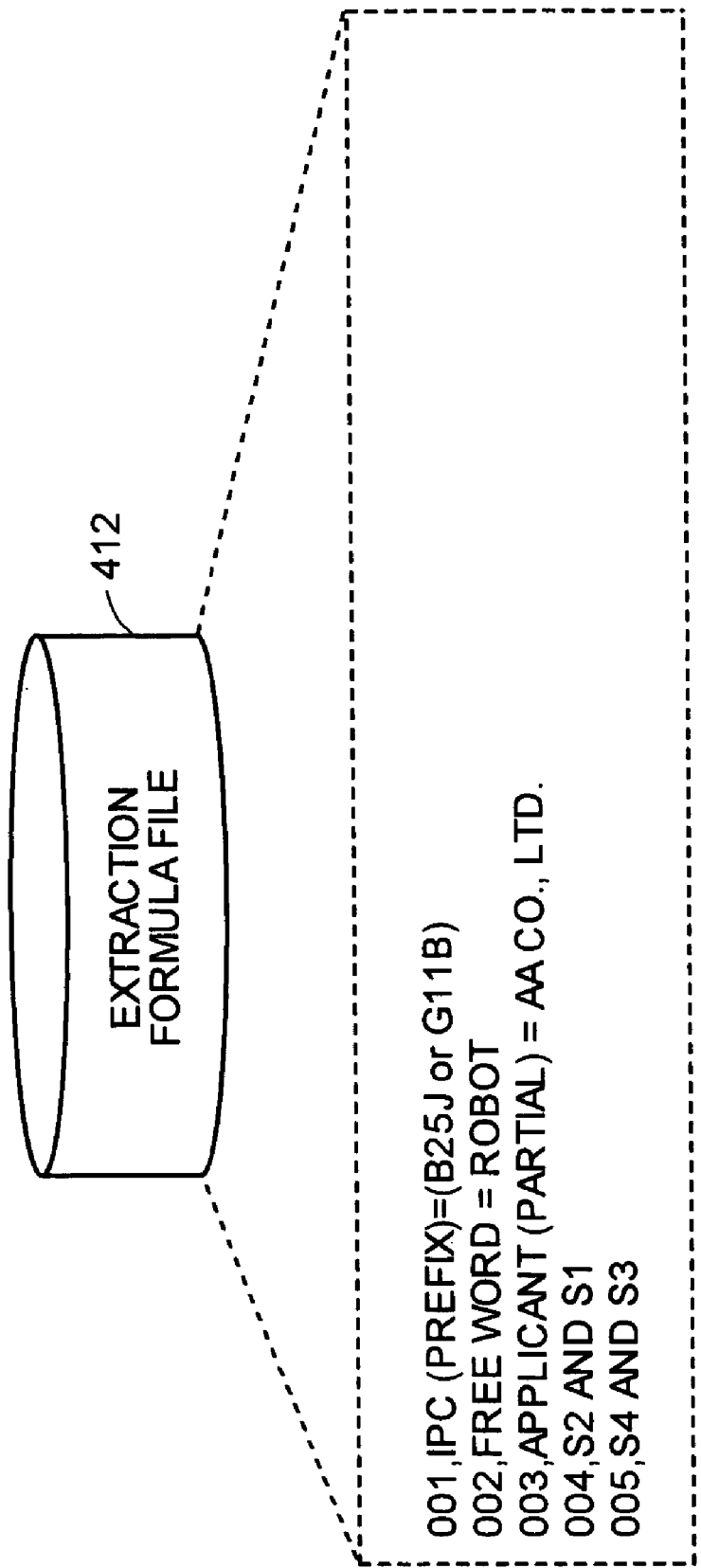
FIG. 7 is for explaining the contents of an extraction formula file.

The extraction formula creating/saving AP 411 searches the entity DB 200 according to the search formula input on the search formula creating screen 416 by the client 400a, and checks the number of the corresponding data on a screen of the information terminal device 25. When the "save" button 417a is clicked on the search formula saving screen 417, the extraction formula creating/saving AP 411 saves the extraction formula in the extraction formula file 412. FIG. 7 is for explaining the contents of the extraction formula file 412. The number of corresponding data is saved in the number of corresponding data storage file 413. The extraction formula creating/saving AP 411 realizes the functions of the extraction condition input section 202 and the extraction section 203 illustrated in FIG. 2.

The upper limit number of data setting AP 414 displays the upper limit number of data setting screen 418, and sets items which are prioritized as the setting of the upper limit number of data and as the upper limit number of data. The upper limit number of data setting AP 414 realizes the functions of the upper limit number of data information input section 206, the number of data information extraction section 207, the number of data information display control section 208, and the range change section 209 shown in FIG. 2. FIG. 8 is for explaining the upper limit number of data setting screen 418 with which the service administrator 400a sets the upper limit number of data. In FIG. 8, the service administrator 400a can select one desired upper limit value using radio buttons 419.

At this time, a menu, which seems optimal as the upper limit number of data to be selected, is determined based on the number of currently hit data in a main field set (the first data group) stored in the number of corresponding data storage file 413, and this is displayed. A menu which seems inappropriate as the upper limit number of data to be selected may be set not to be displayed, or may be displayed in a gray out manner so as not to be selected (disabled). This case includes "to 3000000", "to 4000000", "to 5000000", and the like when the main field set is 100000.

One radio button 420 is clicked so as to select one of priority setting methods. For example, the upper limit number of data is defined up to 100000, and the following priority setting methods can be considered as prioritizing parameters, which prioritize the latest data so as to set the number of hit data within a range of the upper limit value. The methods are such that "older issue date of data (issue date of gazette) is prioritized", "later issue date of data (issue date of gazette) is prioritized", "data which are patented (patent gazette) are prioritized", "specified applicant (name of a firm) is prioritized", and "specified technical classification (such as IPC, FI, F term) is prioritized". The specified applicant or the specified technical field is input into a predetermined input section.

The information about the upper limit number of data set on the upper limit number of data setting screen 418 is saved in the upper limit number of data setting file 415. FIG. 9 is an example of the contents of the upper limit number of data setting file 415. In FIG. 9, the upper limit number of data setting file 415 contains "100000" as "the upper limit number of data", "prioritized item" as "applicant", and "AA Co., Ltd., XX Co., Ltd., and YY Co., Ltd." as "prioritized condition" which are names of applicants.

On the upper limit number of data setting screen 418, when the option "older issue date of a gazette is prioritized" is selected, the "prioritized item" is "data issue date", and the "prioritized condition" is "the oldest". On the other hand, when the option "later issue date of gazette is prioritized" is selected, the "prioritized item" is "data issue date", and the "prioritized condition" is "the latest".

Figure 10:
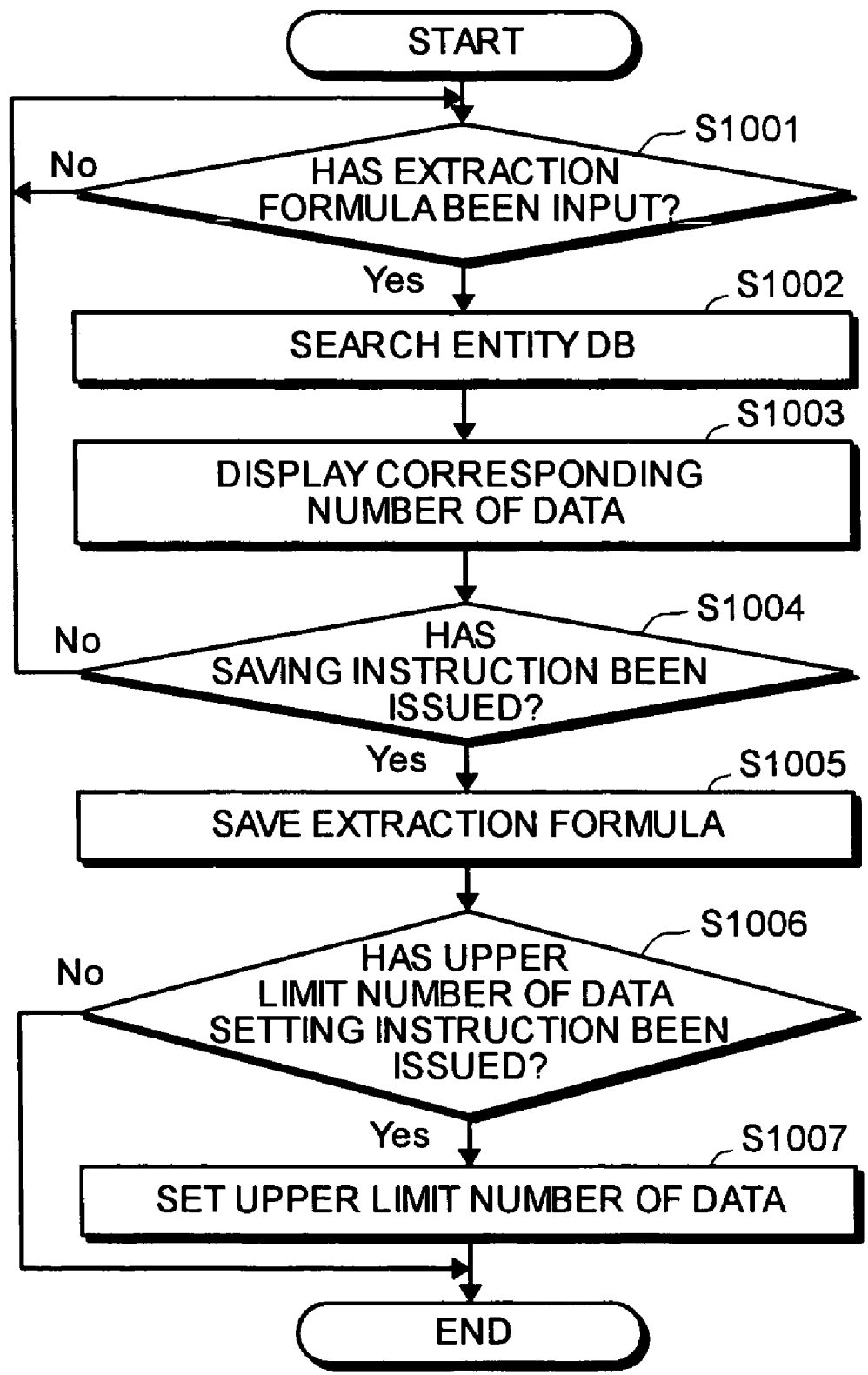
FIG. 10 is a flowchart of a preprocess executed by an extraction formula creating/saving application (hereinafter, "AP") and an upper limit number of data setting AP.

FIG. 10 is a flowchart of a preprocess 401 executed by the extraction formula creating/saving AP 411 and the upper limit number of data setting AP 414. In the flowchart of FIG. 10, it is determined whether the extraction formula has been input from the information terminal device 251 of the service administrator 400a (step S1001). When the sequence waits for the input and the extraction formula is input (Yes at step S1001), the entity DB 200 is searched based on the extraction formula (step S1002). As a result of the search, the number of corresponding data is displayed on the information terminal device 251 of the service administrator 400a (step S1003).

It is determined whether a save instruction has been issued from the information terminal device 251 of the service administrator 400a (step S1004). When the instruction is not issued (No at step S1004), the sequence returns to step S1001, and the steps S1001 to S1004 are repeated. On the other hand, when the saving instruction is issued (Yes at step S1004), the input extraction formula is saved (step S1005).

It is determined whether an upper limit number of data setting instruction has been issued (step S1006). When the instruction is issued (step S1006: Yes), the upper limit number of data is set (step S1007), the process is ended. On the other hand, when the upper limit number of data setting instruction is not issued (step S1006: No), the process is terminated.

The process before starting service 402 requires a main field set creating AP 421 and a main field set (number list) file 422 (see FIG. 4). The main field set application AP 421 searches the entity DB 200, according to an extraction formula stored in the extraction formula file 412, at the time of actuating the service for the service user (end user) 400b, i.e., every morning. The main field set file 422 containing a list of corresponding data numbers is created. When the number of corresponding data exceeds the number of data in the upper limit number of data setting file 415, an upper limit flag is displayed for the extra data in the main field set file 422.

Figure 11:
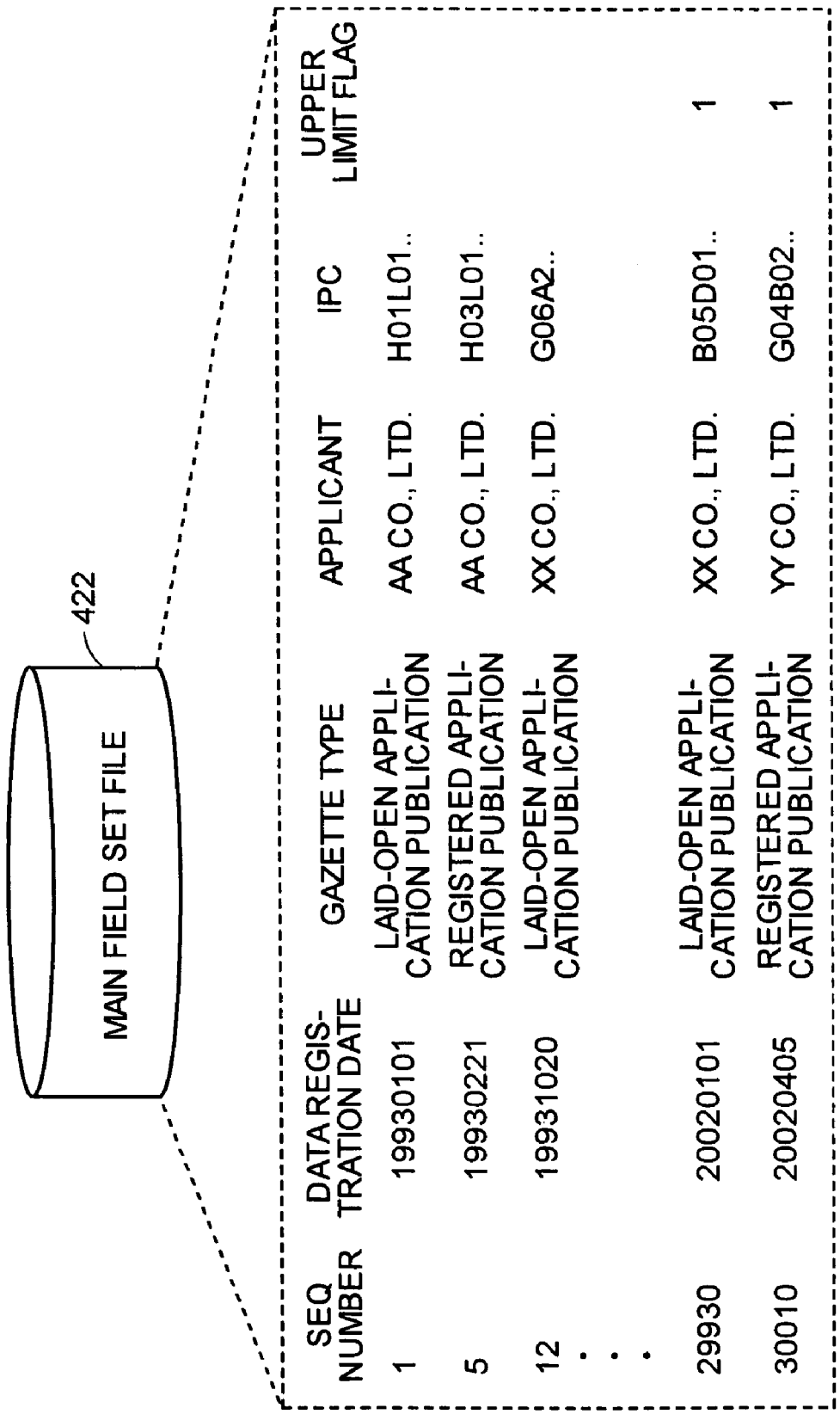
FIG. 11 is an example of contents of a main field set file.

FIG. 11 is an example of the contents of the main field set file 422. In the main field set file 422, 'SEQ number' is unique in the entity DB 200, 'data registration date', is a date at which data are recorded in the entity DB 200, 'gazette type' represents a laid-open publication or a registered publication, 'applicant' represents a name of a firm that makes an application in the gazette, 'IPC' represents technical classification given to the gazette, and 'upper limit flag' is set to "1" if data is out of the upper limit number range in the main field set creating AP 421.

Figure 12:
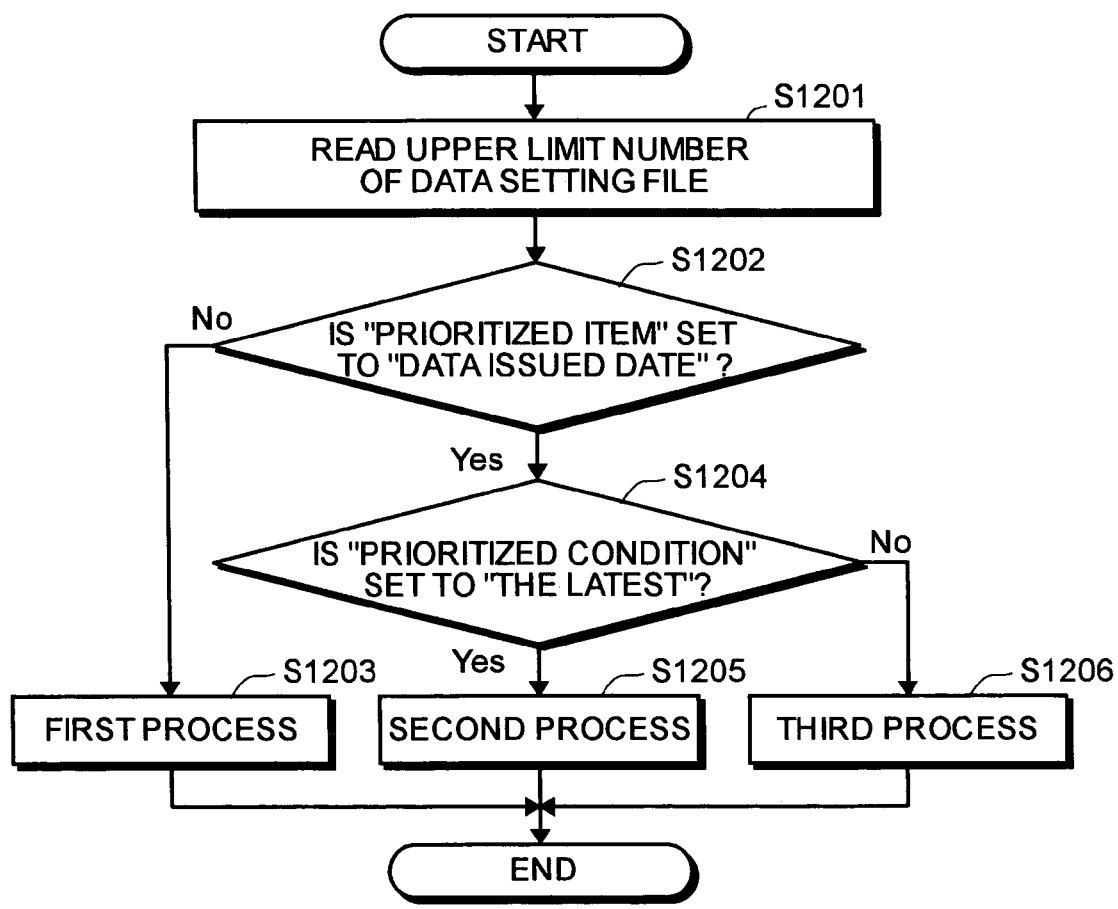
FIG. 12 is a flowchart of a process before starting service executed by a main field set creating AP.

FIG. 12 is a flowchart of the process before starting service 402 executed by the main field set creating AP 421. Data are read from the upper limit number of data setting file 415 (step S1201). It is determined whether the 'prioritized item' in the read data is set to "data issue date" (step S1202). When the 'prioritized item' is not set to "data issue date" (No at step S1202), a first process shown in FIG. 13 is executed (step S1203).

Figure 14:
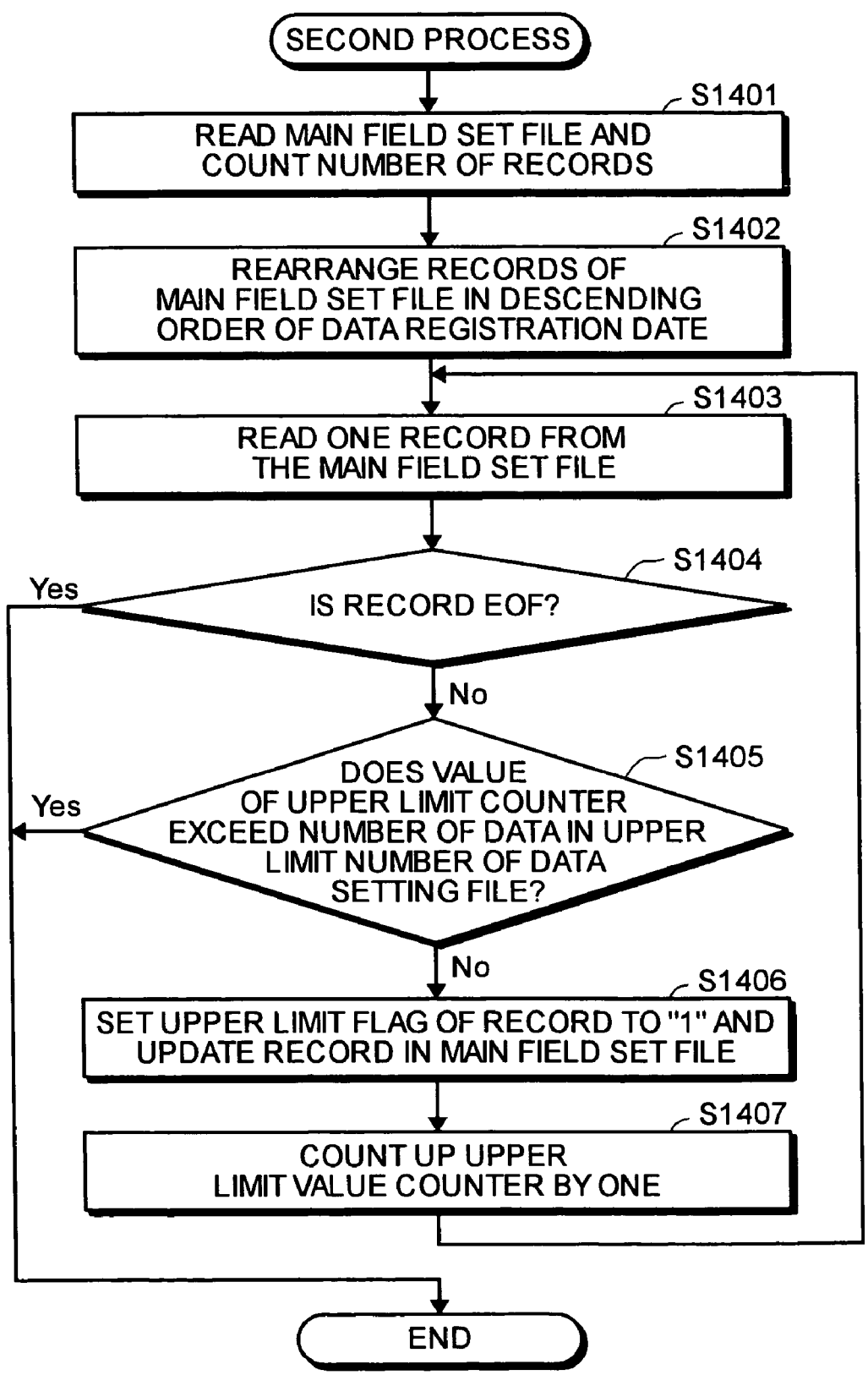
FIG. 14 is a flowchart of a second process executed as part of the process before starting service executed by the main field set creating AP.

On the other hand, when the 'prioritized item' is set to "data issue date" (Yes at step S1202), it is determined whether the 'prioritized condition' is set to "the latest" (step S1204). When the 'prioritized condition' is set to "the latest" (Yes at step S1204), a second process shown in FIG. 14 is executed (step S1205). When the 'prioritized condition' is not set to "the latest" (No at step S1204), a third process shown in FIG. 15 is executed (step S1206).

Figure 13:
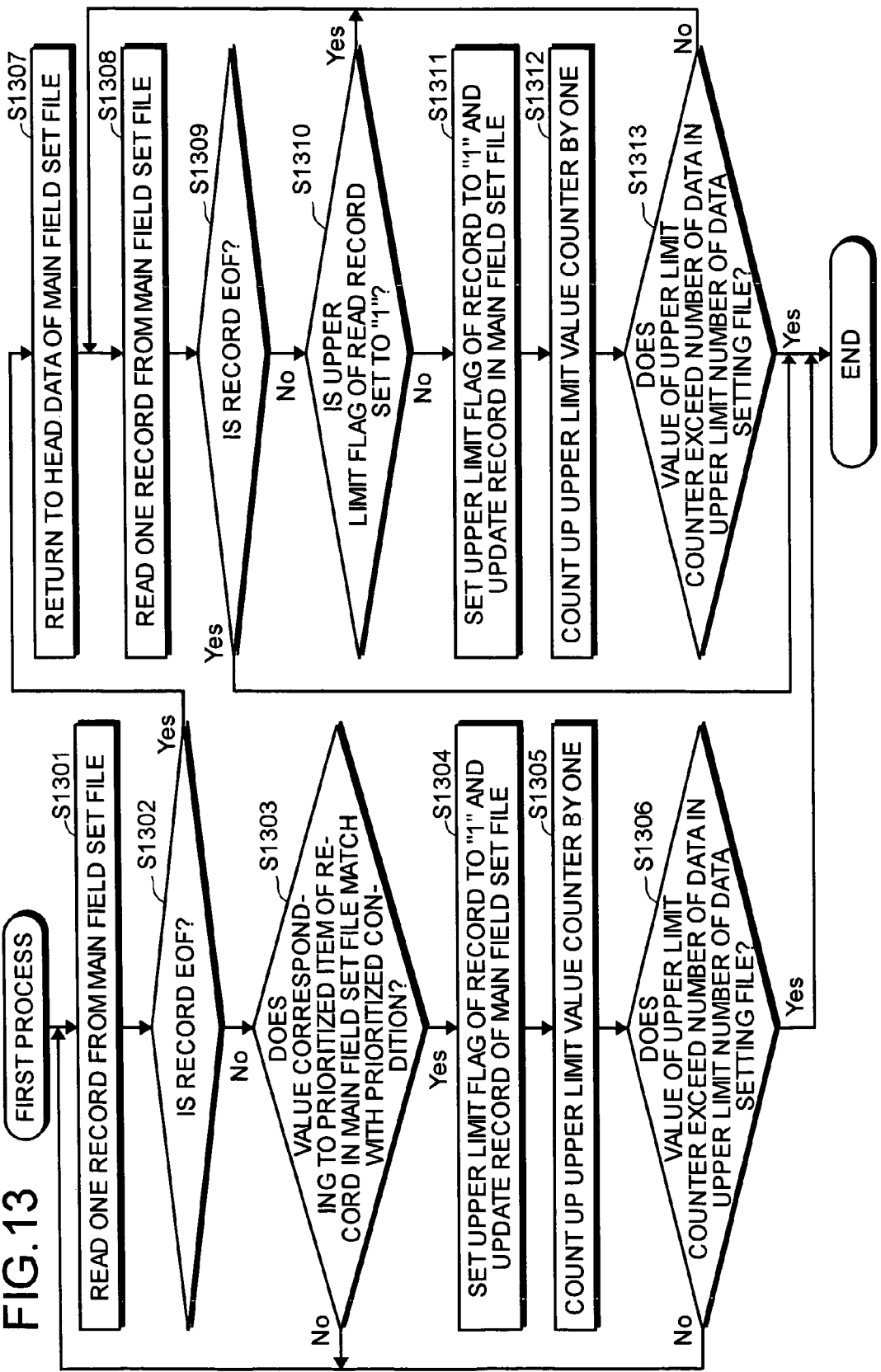
FIG. 13 is a flowchart of a first process executed as part of the process before starting service executed by the main field set creating AP.

FIG. 13 is a flowchart of a first process executed as part of the process before starting service executed by the main field set creating AP. In the first process, one data record is read from the main field set file 422 (step S1301). It is determined whether the record is EOF (end of file) (step S1302). When the record is not EOF (No at step S1302), it is determined whether a value corresponding to the prioritized item of the record in the main field set file 422 matches with the prioritized condition (step S1303).

At step S1303, when the value does not match with the prioritized condition (No at step S1303), the sequence returns to step S1301. On the other hand, when the value matches with the prioritized condition (Yes at step S1303), the upper limit flag of the record read is set to "1", and the record of the main field set file 422 is updated (step S1304). Further, an upper limit value counter (not shown) is counted up by one (step S1305).

It is determined whether the value of the upper limit counter exceeds the number of data in the upper limit number of data setting file 415 (step S1306). When the value of the counter does not exceed the number of data (No at step S1306), the sequence returns to step S1301, and the steps S1301 to S1306 are repeated. On the other hand, if the value of the counter exceeds the number of data (Yes at step S1306), the process is ended.

When the record is EOF at step S1302 (Yes at step S1302), the sequence returns to head data in the main field set file 422 (step S1307). One record is read from the main field set file 422 (step S1308). It is determined whether the record is EOF (step S1309), and when it is EOF, (Yes at step S1309), the process is ended.

On the other hand, when the record is not EOF (No at step S1309), it is determined whether the upper limit flag of the record is set to "1" (step S1310). When the upper limit flag is set to "1" (Yes at step S1310), the sequence returns to step S1308.

On the other hand, when the upper limit flag is not set to "1" (No at step S1310), the upper limit flag of the record is set to "1", and the record in the main field set file 422 is updated (step S1311). Further, the upper limit value counter is counted up by one (step S1312).

It is determined whether the value of the upper limit value counter exceeds the number of data in the upper limit number of data setting file 415 (step S1313). If the value does not exceed the number of data (No at step S1313), the sequence returns to step S1308, and steps S1308 to S1313 are repeated. On the other hand, when the value exceeds the number of data (Yes at step S1313), the process is ended.

FIG. 14 is a flowchart of a second process executed as part of the process before starting service executed by the main field set creating AP. In the second process, the main field set file 422 is read so that the number of records is counted (step S1401). The records in the main field set file 422 are rearranged in a descending order of the data registration date (step S1402). One data record is read from the main field set file 422 (step S1403). It is determined whether the record is EOF (step S1404).

When the record is not EOF at step S1404 (No at step S1404), it is determined whether the value of the upper limit value counter exceeds the number of data in the upper limit number of data setting file 415 (step S1405). When the value does not exceed the number of data (No at step S1405), the upper flag of the record is set to "1", and the record in the main field set file 422 is updated (step S1406). Further, the upper limit value counter (not shown) is counted up by one (step S1407). The sequence returns to step S1403.

When the record is EOF (Yes at step S1404), or when the value of the upper limit counter exceeds the number of the date in the upper limit number of data setting file 415 (Yes at step S1405), the process is ended.

FIG. 15 is a flowchart of a third process executed as part of the process before starting service executed by the main field set creating AP. The flowcharts of FIG. 14 and FIG. 15 differ in steps S1402 and S1502 respectively. That is to say, the records in the main field set file 422 are rearranged in the descending order of the data registration date at step S1402, but the records in the main field set file 422 are rearranged in the ascending order of the data registration date at step S1502. The other parts of the second and the third processes are similar to each other. Therefore, the explanation of details of the third process is omitted.

The process at the time of using service 403 (see FIG. 4) requires the main field set file 431, an entity DB search AP 432, a search set file 433, a list display AP 434, a query AP 435, and a log file 436. The main field set file 431 is a copy of the main field set file 422. The main field set file 422 is not copied but may be directly used.

The entity DB search AP 432 searches the entity DB 200 based on various search formulas input by the service user (end user) 400b using search screen 437, and stores the list of SEQ numbers corresponding to the data searched, in the search set file 433. The entity DB search AP 432 realizes the functions of the extraction section 203 and the upper limit number of data information input section 206 illustrated in FIG. 2.

FIG. 16 illustrates one example of the contents of the search set file 433. The search set file 433 contains the list of SEQ numbers corresponding to the data searched in the process executed by the entity DB search AP 432. The stored contents are held until the service user 400b ends the use of the service, namely, logs off the service.

The list display AP 434 displays the list of results searched from the search set file 433 using a list display screen 438 on the information terminal device 251 of the service user 400b. The data in the list are displayed in a color-coded (ranked) manner based on the main field set file 431. Specifically, data which are present in the main field set file 431 and do not have the upper limit flag set to 1 are indicated by black, data which are present in the main field set file 431 and have the upper light flag set to 1 are indicated by yellow, and data which are not present in the main field set file 431 are indicated by red. The list display AP 434 realizes the functions of the determination section 204 and the search result display control section 205 shown in FIG. 2.

FIG. 17 is a flowchart of the color code (ranking) determination process executed by the list display AP 434. All the records in the main field set file 431 are read (step S1701). One record in the search set file 433 is read (step S1702). It is determined whether the record is EOF (step S1703). When the record is not EOF (No at S1703), it is determined whether the SEQ number of the record in the search set file 433 is present in the main field set file 431 (step S1704).

When the SEQ number is not present in the main field set file 431 (No at step S1704), "SEQ number+R" is written into a screen display work file (not shown) (step S1705), and the sequence returns to step S1702. On the other hand, when the SEQ number is present in the main field set file 431 (Yes at step S1704), it is determined whether the upper limit flag of the record in the main field set file 431 is set to "1" (step S1706).

When the upper limit flag is set to "1" (Yes at step S1706), "SEQ number+Y" is written into the screen display work file (step S1707), and the sequence returns to step S1702. On the other hand, when the upper limit flag is not set to "1" (No at step S1706), "SEQ number+B" is written into the screen display work file (step S1708), and the sequence returns to step S1702.

When the record is EOF (Yes at step S1703), it indicates that all the records in the screen display work file have been read. On the list display screen 438, SEQ number+R is indicated by red, SEQ number+Y is indicated by yellow, and SEQ number+B is indicated by black (step S1709), and the process is ended.

FIG. 18 is example of the list display screen 438. The list display AP 434 displays the data searched from the search set file 433 in a color-coded manner. Data which are present in the main field set file 431 and do not have the upper limit flag set to 1 are indicated by black, data which are present in the main field set file 431 and have the upper limit flag set to 1 are indicated by yellow, and data which are not present in the main field set file 431 are indicated by red. When the data displayed are indicated by the respective colors, either the colors of the characters of the data may be varied, or the background colors of the characters may be varied. In such a manner, the service user can recognize the set to which each file belongs. Instead of varying of the colors, brightness of the characters and the backgrounds may be varied, or font, thickness, and the like of the characters may be varied. Further, the respective data may be represented by marks or symbols having their own meanings.

Figure 20:
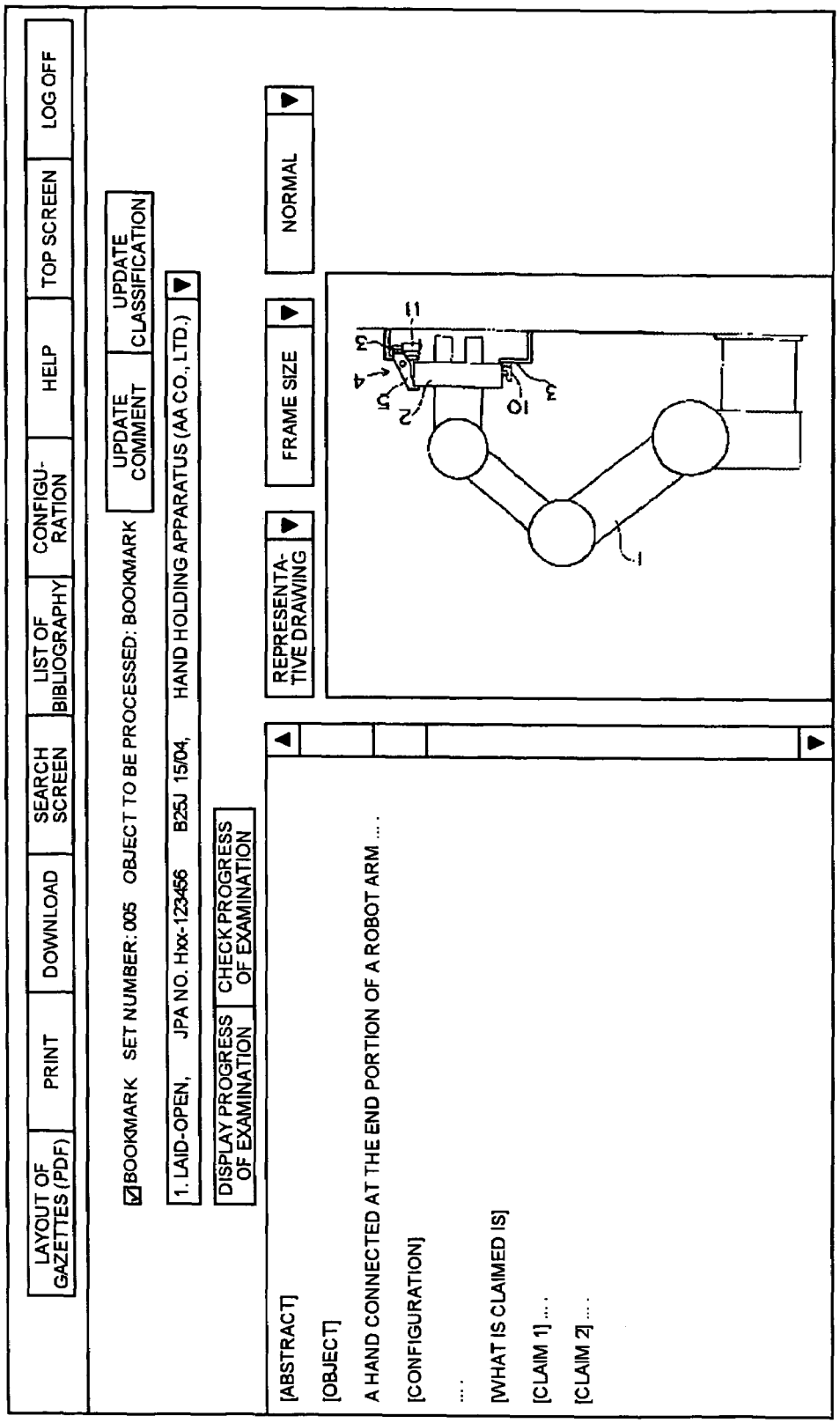
FIG. 20 is an example of a query screen (gazette display screen)

The query AP (log acquisition) 435 fetches from the entity DB 200, the content of the data selected by the service user 400b on the list display screen 438 and displays the content as a query screen (gazette display screen) 439. The query AP 435 saves the selected data numbers and ranks in the log file 436. FIG. 19 is an example of contents of the log file 436. The log file 436 contains the SEQ number of the queried record and one of ranks: "R"; "Y"; and "B". FIG. 20 is an example of the query screen (publication display screen) 439.

The fee calculating process 404 includes, a fee calculating AP 441, a fee standard table 442, and a charge file 433. The fee calculating AP 441 calculates a fee for a constant period (for example, once in every month). The fee is calculated based on the log file 436, the upper limit number of data setting file 415 and the fee standard table 442. The fee calculating AP 441 realizes the function of the fee deciding section 210 illustrated in FIG. 2.

Figure 21:
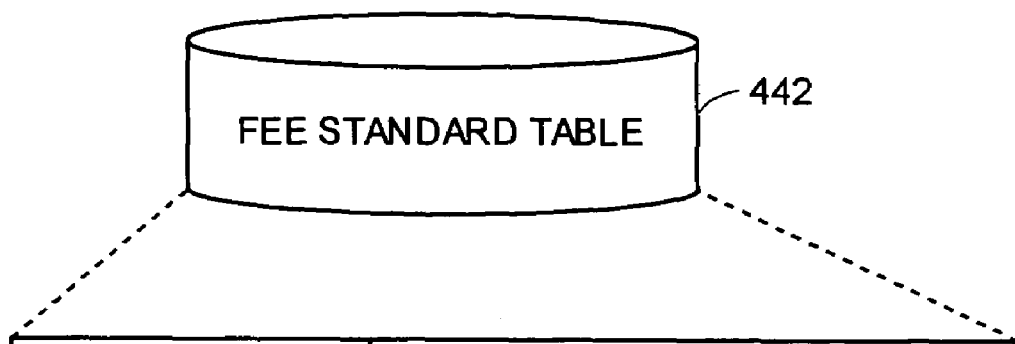
FIG. 21 is an example of contents of a fee standard table.

FIG. 21 is an example of contents of the fee standard table 442. As shown in this table, a unit fee per data in each rank differs according to the set upper limit number of data. The fee is calculated based on the unit fee.

FIG. 22 is a flowchart of the fee calculating process executed by the fee calculating AP 441. First, the upper limit number of data setting file 415 is read (step S2201). A record of the fee standard table 442, corresponding to the upper limit number of data read from the upper limit number of data setting file 415, is read (step S2202). A value obtained by multiplying the upper limit number of data and a value of the rank B in the fee standard table 442, is written into the charge file 443 (step S2203).

Thereafter, one record in the log file 436 is read (step S2204). It is determined whether the record is EOF (step S2205). When the record is not EOF (No at step S2205), it is determined whether a rank of the record read from the log file 436 is "B" (step S2206). When the rank is "B" (Yes at step S2206), the sequence returns to S2204.

On the other hand, when the rank of the record read from the log file 436 is not "B" (No at step S2206), it is determined whether the rank is "Y" (step S2207). When the rank is "Y" (Yes at step S2207), a value of the rank Y in the fee standard table 442 is added to the value of the charge file 443. The value in the charge file 443 is updated by the obtained value (step S2208), and the sequence returns to step S2204. On the other hand, when the rank of the record read from the log file 436 is not "Y" at step S2207 (No at step S2207), it is determined whether the rank is "R". A value of the rank R in the fee standard table 442 is added to the value of the charge file 443. The value of the charge file 443 is updated by the obtained value (step S2209), and the sequence returns to step S2204.

Steps S2204 to S2209 are repeated in this manner, and when the record read from the log file 436 is EOF (Yes at step S2205), the value of the charge file 443 is output (step S2210), and the process is ended.

Thus, for the client, the cost of using information that is frequently needed is low. Whereas, the cost of using information that is seldom needed or as the need arises, is high. A database service provider or the like can provide a different fee structure based on the usage and the needs of clients. The upper limit number of data in a field requested to be used by the client can be set appropriately.

The following is an example of the fee structure system. "For a certain client, the unit fee per information present in the main field is set to a low value, but a client is charged for the entire field. On the other hand, when information present in a noise field is referred to, although the unit fee per information is set higher, the information is charged only at the time of reference".

When a constant condition is set even in the main field, the data in the main field can be ranked so that a more precise fee system can be provided. The following is an example of such fee structure system. "In the main field, when the number of data exceeds the upper limit number of data in the entire main field purchased by the client, an extra portion out of the upper limit range is referred to. In this case, this portion is distributed at an extra charge of a unit fee per information." The fee systems of three ranks can be provided.

About 10000 new data are added to the patent information every week. In the charge system of a conventional internet database service, a fee for one piece of information is always constant when the number of data exceeds the upper limit number of data at the time of initial contract. Therefore, the client is not charged on the basis of needs. In the fee structure of the present invention, however, the field mainly required by a client is sorted from another field, so that each piece of information is ranked, and the fee can be changed according to the ranks. For this reason, a charge process that meets the needs of the clients can be realized.

The data distribution method may be realized on computer. For example, the method may be realized on a computer, such as a personal computer or a work station, by executing a computer program. This program is recorded in a computer-readable recording medium, such as an HD, an FD, a CD-ROM, an MO, or DVD. The program may be distributed over a network such as the Internet.

As explained above, according to the present invention, there is provided a data distribution method, a computer program, and a data distribution apparatus that can provide a fee distribution system that meet the needs of clients, and that can be easily understood by the clients.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data distribution method comprising:

inputting a first extraction condition;

extracting a first data group from data registered in a database based on the first extraction condition;

inputting an order condition;

arranging data in the first data group in a specific order based on the order condition;

inputting a second extraction condition;

extracting a second data group from the database based on the second extraction condition;

extracting common data that is data that belongs to both the first data group arranged in the specific order and the second data group;

inputting an upper limit number;

extracting from the common data first the upper limit number of data as a third data group; and displaying information about the third data group and other data, which is data in the second data group other than the third data group, in a distinguishable manner.

2. The data distribution method according to claim 1, further comprising:

extracting information about a number of data that belongs to the first data group after extracting the first data group; and displaying the information about the number of data that belongs to the first data group before the inputting of the upper limit number.

3. The data distribution method according to claim 1, further comprising:

extracting information about a number of data that belongs to the first data group after extracting the first data group; and changing a range of the upper limit number based on the information about the number of data extracted.

4. The data distribution method according to claim 1, further comprising deciding a fee to be charged for distribution of data based on contents of the common data.

5. A data distribution method comprising:

inputting a first extraction condition;

extracting a first data group from data registered in a database based on the first extraction condition;

inputting an order condition;

arranging data in the first data group in a specific order based on the order condition;

inputting a second extraction condition;

extracting a second data group from the database based on the second extraction condition;

extracting common data that is data that belongs to both the first data group arranged in the specific order and the second data group;

inputting an upper limit number;

extracting from the common data first the upper limit number of data as a third data group;

extracting from the common data, data other than the third data group as a fourth data group;

displaying information about the third data group, the fourth data group, and other data, which is data in the second data group other than the third data group and the fourth data group, in a distinguishable manner.

6. The data distribution method according to claim 5, further comprising:

extracting information about a number of data that belongs to the first data group after extracting the first data group; and displaying the information about the number of data that belongs to the first data group before the inputting of the upper limit number.

7. The data distribution method according to claim 5, further comprising:

extracting information about a number of data that belongs to the first data group after extracting the first data group; and changing a range of the upper limit number based on the information about the number of data extracted.

8. The data distribution method according to claim 5, further comprising deciding a fee to be charged for distribution of data based on contents of the common data.

9. A computer-readable recording medium storing a computer program that causes a computer to execute:

inputting a first extraction condition;

extracting a first data group from data registered in a database based on the first extraction condition;

inputting an order condition;

arranging data in the first data group in a specific order based on the order condition;

inputting a second extraction condition;

extracting a second data group from the database based on the second extraction condition;

extracting common data that is data that belongs to both the first data group arranged in the specific order and the second data group;

inputting an upper limit number;

extracting from the common data first the upper limit number of data as a third data group; and displaying information about the third data group and other data, which is data in the second data group other than the third data group, in a distinguishable manner.

10. A computer-readable recording medium storing a computer program that causes a computer to execute:

inputting a first extraction condition;

extracting a first data group from data registered in a database based on the first extraction condition;

inputting an order condition;

arranging data in the first data group in a specific order based on the order condition;

inputting a second extraction condition;

extracting a second data group from the database based on the second extraction condition;

extracting common data that is data that belongs to both the first data group arranged in the specific order and the second data group;

inputting an upper limit number;

extracting from the common data first the upper limit number of data as a third data group;

extracting from the common data, data other than the third data group as a fourth data group;

displaying information about the third data group, the fourth data group, and other data, which is data in the second data group other than the third data group and the fourth data group, in a distinguishable manner.

11. A data distribution apparatus comprising:

an inputting unit that receives input of a first extraction condition, a second extraction condition, an order condition, and an upper limit number;

a first extracting unit that extracts a first data group from data registered in a database based on the first extraction condition;

an arranging unit that arranges data in the first data group in a specific order based on the order condition;

a second extracting unit that extracts a second data group from the database based on the second extraction condition, extracts common data that is data that belongs to both the first data group arranged in the specific order and the second data group, and extracts from the common data first the upper limit number of data as a third data group; and a display displaying information about the third data group and other data, which is data in the second data group other than the third data group, in a distinguishable manner.

12. A data distribution apparatus comprising:

an inputting unit that receives input of a first extraction condition, a second extraction condition, an order condition, and an upper limit number;

a first extracting unit that extracts a first data group from data registered in a database based on the first extraction condition;

an arranging unit that arranges data in the first data group in a specific order based on the order condition;

a second extracting unit that extracts a second data group from the database based on the second extraction condition, extracts common data that is data that belongs to both the first data group arranged in the specific order and the second data group, extracts from the common data first the upper limit number of data as a third data group, and extracts from the common data, data other than the third data group as a fourth data group; and a display displaying information about the third data group, the fourth data group, and other data, which is data in the second data group other than the third data group and the fourth data group, in a distinguishable manner.

* * * * *